US012778109B2

(12) United States Patent
Katsileros et al.

(10) Patent No.: US 12,778,109 B2
(45) Date of Patent: Nov. 3, 2026

(54) SYSTEMS AND METHODS FOR LASER WEEDING

(71) Applicant: TERRA ROBOTICS P.C., Salonika (GR)

(72) Inventors: Petros Katsileros, Salonika (GR); Konstantinos Kandylas, Salonika (GR); Christos Papaioannidis, Salonika (GR); Evangelos Tsioumas, Salonika (GR)

(73) Assignee: TERRA ROBOTICS P.C., Salonika (GR)

( * ) Notice: Subject to any disclaimer, the term of this patent is extended or adjusted under 35 U.S.C. 154(b) by 0 days.

(21) Appl. No.: 19/561,752

(22) Filed: Mar. 10, 2026

(65) Prior Publication Data

US 2026/0198476 A1 Jul. 16, 2026

Related U.S. Application Data

(63) Continuation of application No. PCT/IB2025/059451, filed on Sep. 19, 2025.

(Continued)

(51) Int. Cl.

*A01M 21/04* (2006.01)
*G06V 10/764* (2022.01)

(Continued)

(52) U.S. Cl.

CPC ........... *A01M 21/04* (2013.01); *G06V 10/764* (2022.01); *G06V 10/82* (2022.01); *G06V 20/56* (2022.01);

(Continued)

(58) Field of Classification Search

CPC ..................................................... A01M 24/04

See application file for complete search history.

(56) References Cited

U.S. PATENT DOCUMENTS

| | | | |
|---|---|---|---|
| 5,606,821 | A | 3/1997 | Sadjadi et al. |
| 8,180,514 | B2 | 5/2012 | Kaprielian et al. |

(Continued)

FOREIGN PATENT DOCUMENTS

| | | | |
|---|---|---|---|
| AU | 2021101399 | A4 | 5/2021 |
| AU | 2021107451 | A4 | 12/2021 |

(Continued)

OTHER PUBLICATIONS

Escarda "Laserweeding System: Technology that Changes How We Control Weeds" Available at https://www.escarda.tech/products/; 2026.

(Continued)

*Primary Examiner* — Joshua J Michener
*Assistant Examiner* — Henry Hooper Mudd
(74) *Attorney, Agent, or Firm* — Jason H. Vick; Amped IP LLC

(57) ABSTRACT

Weeds are often viewed negatively because they compete with desired plants (like crops or flowers) for resources like sunlight, water, and nutrients. They can also hinder gardening and farming operations, harbor pests and diseases, and potentially pose risks to humans and animals. Chemical solutions for weeds can be costly, not entirely effective and can cause long term negative impacts on the environment. Discussed herein is a new technology directed to a laser-based technique for weed control. The system can be attached to a tractor, a drone (an unmanned aircraft that is guided remotely or autonomously), a ATV (all-terrain vehicle), or in general any vehicle or piece of equipment such as agricultural equipment.

24 Claims, 15 Drawing Sheets

Related U.S. Application Data

(60) Provisional application No. 63/699,260, filed on Sep. 26, 2024.

(51) Int. Cl.
*G06V 10/82* (2022.01)
*G06V 20/56* (2022.01)

(52) U.S. Cl.
CPC ...... *G06V 2201/07* (2022.01); *G06V 2201/12* (2022.01)

(56) References Cited

U.S. PATENT DOCUMENTS

| | | | |
|---|---|---|---|
| 9,565,848 | B2 | 2/2017 | Stowe et al. |
| 10,845,810 | B2 | 11/2020 | Flajolet et al. |
| 10,863,668 | B2 | 12/2020 | Chrysanthakopoulos et al. |
| 11,553,636 | B1 | 1/2023 | Palomares et al. |
| 11,596,139 | B2 | 3/2023 | Palomares et al. |
| 11,602,143 | B2 | 3/2023 | Mikesell et al. |
| 12,108,752 | B2 | 10/2024 | Mikesell et al. |
| 2017/0238460 | A1 | 8/2017 | MacKean et al. |
| 2019/0200519 | A1* | 7/2019 | Chrysanthakopoulos .................. A01D 34/00 |
| 2021/0105995 | A1 | 4/2021 | Palomares et al. |
| 2021/0112704 | A1 | 4/2021 | Cavender-Bares |
| 2021/0144903 | A1 | 5/2021 | Javault et al. |
| 2022/0071192 | A1 | 3/2022 | Benoit-Levy et al. |
| 2022/0117215 | A1* | 4/2022 | Sibley ..................... A01M 7/00 |
| 2022/0299635 | A1* | 9/2022 | Sergeev .................. G01S 17/04 |
| 2022/0312757 | A1* | 10/2022 | Geiger .................. A01M 21/04 |
| 2023/0252624 | A1* | 8/2023 | Sergeev .................... G06T 7/00 |
| 2023/0397596 | A1* | 12/2023 | Chang ................... A01M 21/04 |
| 2023/0404056 | A1 | 12/2023 | Sibley et al. |
| 2024/0303838 | A1 | 9/2024 | Dana et al. |
| 2025/0374911 | A1* | 12/2025 | Azuchi ................. A01M 21/04 |

FOREIGN PATENT DOCUMENTS

| | | | |
|---|---|---|---|
| BR | 102020017072 | A2 | 3/2022 |
| BR | 102022019820 | A2 | 4/2023 |
| CA | 3089518 | A1 | 8/2019 |
| CN | 101589705 | A | 12/2009 |
| CN | 104206057 | A | 12/2014 |
| CN | 104542551 | A | 4/2015 |
| CN | 205492227 | U | 8/2016 |
| CN | 106561093 | A | 4/2017 |
| CN | 209560367 | U | 10/2019 |
| CN | 110800393 | A | 2/2020 |
| CN | 111165092 | A | 5/2020 |
| CN | 111819984 | A | 10/2020 |
| CN | 112154722 | A | 1/2021 |
| CN | 212306053 | U | 1/2021 |
| CN | 113455486 | A | 10/2021 |
| CN | 113632779 | A | 11/2021 |
| CN | 114027021 | A | 2/2022 |
| CN | 215775112 | U | 2/2022 |
| CN | 114648500 | A | 6/2022 |
| CN | 114747561 | A | 7/2022 |
| CN | 115648163 | A | 1/2023 |
| CN | 218681465 | U | 3/2023 |
| CN | 218942107 | U | 5/2023 |
| CN | 116250523 | A | 6/2023 |
| CN | 116322300 | A | 6/2023 |
| CN | 116508740 | A | 8/2023 |
| CN | 116250523 | B | 6/2024 |
| DE | 202022001391 | U1 | 7/2022 |
| DE | 102023103252 | B3 | 3/2024 |
| EP | 2848120 | A1 | 3/2015 |
| IN | 202141026549 | A | 7/2021 |
| IN | 202221075319 | A | 1/2023 |
| LV | 15634 | B | 2/2023 |
| NZ | 765445 | A | 10/2020 |
| RU | 2766888 | C1 | 3/2022 |
| WO | WO 2014/111387 | A1 | 7/2014 |
| WO | WO 2021/055485 | A1 | 3/2021 |
| WO | WO 2022/187899 | A1 | 9/2022 |
| WO | WO 2022/197831 | A1 | 9/2022 |
| WO | WO 2023/049979 | A1 | 4/2023 |
| WO | WO 2023/108843 | A1 | 6/2023 |
| WO | WO 2023/141144 | A1 | 7/2023 |
| WO | WO 2024/121669 | A1 | 6/2024 |

OTHER PUBLICATIONS

LaserWeeder G2: Boost Crop Yields and Cut Weed Control Costs—Carbon Robotics; Available at https://carbonrobotics.com/laserweeder-g2; 2026.
Pixel Farming Robotics "Laser Technology: Answers to all your burning questions" Available at https://pixelfarmingrobotics.com/laser-technology/; Date Unknown.
We Laser Project: Eco-Innovative Weeding with Laser; Available at https://welaser-project.eu/; 2026.
International Search Report for International Patent Application No. PCT/IB2025/059451, mailed Jan. 8, 2026.
Written Opinion for International Patent Application No. PCT/IB2025/059451, mailed Jan. 8, 2026.

* cited by examiner

SYSTEMS AND METHODS FOR LASER WEEDING

CROSS REFERENCE TO RELATED APPLICATIONS

The present application is a continuation of International Patent Application No. PCT/IB2025/059451, filed Sep. 19, 2025, which claims the benefit and priority, under 35 U.S.C. § 119(e), to U.S. Provisional Application Ser. No. 63/699,260, filed on Sep. 26, 2024, entitled "SYSTEM AND METHOD FOR LASER WEEDING," each of which are incorporated herein by reference, in their entirety, for all that they teach and for all purposes.

BACKGROUND

The present disclosure is generally directed to removal of unwanted vegetation, and in particular weeds.

SUMMARY

Weeds are often viewed negatively because they compete with desired plants (like crops or flowers) for resources like sunlight, water, and nutrients. They can also hinder gardening and farming operations, harbor pests and diseases, and potentially pose risks to humans and animals. Chemical solutions for weeds can be costly, not entirely effective and can cause long term negative impacts on the environment.

Discussed herein is a new technology directed to a laser-based technique for weed control. The system can be attached to a tractor, a drone (an unmanned aircraft that is guided remotely or autonomously), a ATV (all-terrain vehicle), or in general any vehicle or piece of equipment such as agricultural equipment.

Some of the exemplary non-limiting advantages and benefits of this new technology include, but are not limited to:

- Usage of direct-diode or fiber laser sources for laser weeding that has very low maintenance requirements, is compact, and offers maximum energy efficiency and optimal characteristics in transferring the maximum energy (heat, temperature, energy, power, strength or any related way of using the capabilities of the laser to target the weed) to the roots, meristem or any other part of the weed, above or below the ground, that, if targeted, would assist in killing the weed(s);
- Usage of a single HDR camera sensor to provide robust image frames considering the difficulties of the application environment and also the lighting conditions of the scene affected by the laser beam lighting;
- Usage of an Infrared (IR) cut-off filter on the camera lens to block the light reflections from the laser spot during operation for robust target tracking and detection;
- Elimination of manufacturing requirements considering the transformation method which calculates multiple non-linear transformations for pixel regions in an image frame and uses them to translate pixel targets to laser-scan-head commands in the real-world;
- Integration of an absolute distance sensor to a 3D depth/surface reconstruction pipeline to guarantee stable and accurate algorithm outputs as also real-time validation checks on model outputs;
- Development and Integration of the Depth Error Targeting Correction equations which simplify the calibration process using the calculated transforms for a single calibration distance and making them relevant in any working height;
- Optimized laser system setup-source type (direct-diode-laser), laser optics (parallel beam spot) and laser power to maximize the damage to the weeds with maximum energy transfer (heat) from the stem and leaves to the roots of the weeds;
- Optimized laser optics for parallel beam in the whole working range of specific size (2-10 mm) considering the application requirements;
- The laser beam may be static in terms of it's size during operation or change in real-time using dynamic beam lasers;
- Optimized hitting pattern per target considering the type, the size and the time needed (dwell time) to treat a specific weed;
- Double laser sources setup per module which provides the option to either target the same weed to maximize impact or different ones to maximize the total capacity;
- Multiple laser modules stacked together, one next to the other, in one exemplary embodiment to cover different field needs (operational width of the tool for the weeding task);
- Extremely fast software loop (less than 10 ms) for the detect and target cycles which minimizes the impact of misalignment between the produced targeting coordinates and the real-world coordinates while the tool is moving without the need of extra sensors like IMU (Inertial Measurement Unit) and/or GPS systems or motion flow estimation algorithms; and
- Parallel and asynchronous execution for the detect and target steps to maximize software throughput and update the targeted position multiple times with new target coordinates from new camera frames or interpolated ones considering moving velocity during the target hitting window.

Furthermore, the exemplary embodiments present a groundbreaking laser weeding system that leverages a suite of technological advancements to offer unparalleled precision and efficiency. Some of the exemplary core strengths of this technology are:

- Novel Use of Direct Diode Lasers: A pioneering application in the field of laser weeding, these lasers are not only more energy-efficient and compact but are also uniquely effective at transferring energy to the roots and/or to the meristem of weeds for a more permanent solution.
- Revolutionary Software-Based Calibration: The system sidesteps the need for expensive and rigid hardware manufacturing through an innovative software calibration process. This allows for in-field calibration and dramatically reduces production costs.
- Advanced Depth Error Correction: Through the clever use of trigonometry, the system can perform a single calibration and then use mathematical formulas, like the one for calculating the new laser angle, to accurately target weeds at any height. This is a massive leap in operational flexibility not seen in prior systems.
- High-Speed, Intelligent Targeting: The system's software architecture is uniquely efficient. By running detection and targeting processes in parallel and asynchronously, the system achieves an incredibly fast loop of under 10 milliseconds. This speed virtually eliminates targeting errors caused by vehicle movement, without the need for extra sensors.

- AI-Powered and Self-Improving: At its heart, the system is driven by artificial intelligence. It uses AI for weed detection, 3D mapping, and even features an evolutionary capability to retrain its own models on the device, constantly getting smarter and more accurate over time and through use.
- Robust Optical System for Harsh Environments: The system uses a High Dynamic Range (HDR) camera sensor, which is crucial for getting clear images in the challenging lighting conditions of outdoor fields, from bright sunlight to deep shadows.
- Interference-Proof Imaging: An integrated infrared (IR) cut-off filter on the camera lens is specifically designed to block light reflections from the laser. This is a critical innovation that allows the system to track and target weeds accurately even while the high-power laser is firing, a task that would otherwise be nearly impossible In addition, and for the Agriculture Sector some further benefits include:

- A Greener Revolution: The technology isn't just focused on killing weeds; it's about a fundamental shift towards sustainable farming. This technology can drastically reduce or even eliminate the need for chemical herbicides. This means less chemical runoff into our ecosystems, healthier soil, and organic produce becoming more accessible and affordable.
- Boosting Crop Yields and Quality: By precisely targeting weeds without disturbing the crops or the soil, this system can ensure that valuable resources like water, nutrients, and sunlight go directly to the crops. This can lead to healthier plants and higher yields.
- Solving the Labor Shortage: Finding skilled farm labor is a growing challenge. This automated system can work around the clock, in various conditions, addressing labor shortages and allowing farmers to focus on other critical aspects of their operations.
- Data as the New Harvest: This system does more than just weed—it is further adapted to gather an unprecedented amount of data. As the modules scan every millimeter of the field from a close distance, they collect ultra-high-resolution data about plant health, soil conditions, and weed density. This "ground truth" data is far more granular and timely than satellite imagery, enabling true precision agriculture. Farmers can get insights to optimize irrigation, fertilization, and predict yields with incredible accuracy not before realized.

Beyond this specific usage scenario, the system also provides the additional benefits such as:

- The advanced calibration and targeting system—has incredible potential beyond agriculture. For example, the following non-ag uses could also use the technologies discussed herein:
- Precision Manufacturing: On an assembly line, this system could be adapted for high-speed, precision tasks. Imagine it applying a perfect bead of adhesive inside a complex casing, performing microscopic soldering on a circuit board, or using its HDR camera to spot and flag manufacturing defects invisible to the human eye, all while the production line is moving.
- Infrastructure Maintenance: Mounted on a vehicle or drone, the system could autonomously identify and seal cracks in asphalt or concrete with a specialized emitter. It could also be used for removing graffiti or performing highly detailed structural integrity scans on bridges and tunnels, pinpointing issues before they become critical.
- Automated Construction: In a construction environment, the system could guide robotic arms for tasks like automated welding or riveting on large steel frames. Its depth perception and precision targeting would ensure every weld is perfect, improving both speed and structural safety.
- Military and Defense: The system's ability to rapidly detect, track, and target moving objects makes it a prime candidate for defense applications. A scaled-up version could be the core of a next-generation anti-drone system, capable of identifying and neutralizing multiple aerial threats with high-powered lasers, protecting military bases, convoys, or critical infrastructure.

These are just some examples of the far-reaching capabilities and industries that can benefit from the technology disclosed herein.

Additional features and benefits include a method for accurately targeting a dynamic object in a three-dimensional space, the method comprising a software-based calibration of a camera and an energy-emitting device, real-time 3D reconstruction of the object's environment, and a predictive targeting algorithm that compensates for the motion of the system and the object.

Still further features and benefits include a system for in-field calibration and operation such as an autonomous system for performing precision tasks in an unstructured outdoor environment, the system characterized by its ability to be calibrated in-situ and to dynamically adjust its operations based on real-time sensory data without the need for external positioning systems like GPS or IMUs.

Even further features and benefits include a self-evolving AI model where an artificial intelligence system is sed for robotic control, wherein the system includes a mechanism for on-device data collection, automated data sampling, and in-field retraining of its own machine learning models to improve performance over time through transfer learning and knowledge distillation techniques.

Still further features and benefits include a multi-emitter coordination system such as a system for coordinated multi-emitter targeting, wherein a software controller intelligently allocates one or more emitters to a single target to intensify the effect, or to multiple targets to maximize throughput, based on the characteristics of the targets and the operational goals. This could apply to systems with more than two lasers or even different types of emitters (fiber lasers).

Additional features and benefits include a modular and adaptable system, where a modular robotic tool system comprises a main frame attachable to a vehicle via a standard linkage system and a plurality of self-contained laser modules are mounted adjacently on the frame. A number and spacing of these modules can be configured to match different operational widths of the field, thereby adapting the tool to various field topologies and crop seeding patterns.

More features and benefits include a self-monitoring and calibrating system where a method is presented for ensuring operational integrity in a robotic targeting system, the method comprising performing an initial in-field calibration to map sensor coordinates to emitter commands, continuously monitoring system performance and sensor outputs against expected values during operation, and upon detecting a deviation exceeding a predefined threshold, automatically pausing the targeting task to initiate a recalibration cycle to restore optimal performance and safety.

One additional feature and benefit is that the AI-driven data ecosystem enables a system for creating a precision agriculture data ecosystem, comprising one or more field-deployed robotic modules that collect high-resolution imaging data, an on-device AI model that processes the collected data in real-time to perform a primary task (e.g., weeding) and to identify and label data points of interest, a data pipeline for transmitting this enriched data to cloud storage, and a self-evolving AI framework wherein the collected data is used to incrementally retrain and improve the on-device model, wherein the aggregated data from multiple systems can be used to generate new analytical insights and services for precision agriculture.

These and other benefits and advantages will be realized based on the following more detailed discussion of the exemplary embodiments.

BRIEF DESCRIPTION OF THE DRAWINGS

The exemplary embodiments will be described in detail, with reference to the following figures, wherein.

DETAILED DESCRIPTION

In accordance with one exemplary embodiment, the system includes a laser weeder that includes the following major components:

A Frame: A metal design which can carry one or more laser weeding modules and functions to connect the laser weeder with a tractor, a robot, UAV, or the like.

A laser weeding module (see FIG. 1): A modular device which includes the major components responsible for the laser weeding execution. Specifically, at least one camera, at least one scan-head, at least one direct diode or fiber laser source, at least one distance sensor, at least one AI-embedded computer and additional electronics including those related to the power supply for the above listed components.

A camera: a HDR (High Dynamic Range) camera sensor (such as a 2k, 4k, 8k camera sensor, or the like) which collects detailed information from the scene below the laser weeding module. The HDR is crucial in this application considering the outdoor environment requirements such as high contrast, high dynamic range of the environment, and resolution needed for plant identification, as well as the ability to accommodate the laser beam light reflections.

A scan-head: this subsystem directs/redirects the laser beam to the desired target.

A laser source: the laser source creates the laser beam and transfers it with fiber cable to the scan-head. In one exemplary embodiment, a specific type of laser source (Direct Diode Laser) is utilized while other sources are possible, e.g., faber laser source. Direct diode lasers provide an excellent choice due to their up to 80% electrical-to-optical conversion compared to other types like $CO_2$. They are also compact and (generally) maintenance free which contributes to the robustness and the efficiency of the system operating in harsh environments such as in fields or industrial settings.

A distance sensor: the distance sensor determines the absolute distance of the system to the ground. This component allows the system to know the exact distance between the camera laser setup and the ground at any time. This sensor is used in the software pipeline to simplify the deployment of AI based depth estimation algorithms in the real environment and produce more robust and trustworthy results.

An AI-embedded computer: this system runs the processes related to the operation of the device: Artificial Intelligence (AI) algorithms, laser control algorithms, data collection, diagnostics, and other processes. Using an embedded AI computer is needed for the real-time execution requirements which can be done using the unified memory of such chips to eliminate CPU-to-GPU data transfers during model inference. That way (on chip execution) the system avoids having expensive network calls (e.g., call a model deployed in the cloud through an API) and also zero downtime due to networking issues.

Power supply electronics: these include power supply converters, cables, fuses, PCBs, etc.

Figure 1:
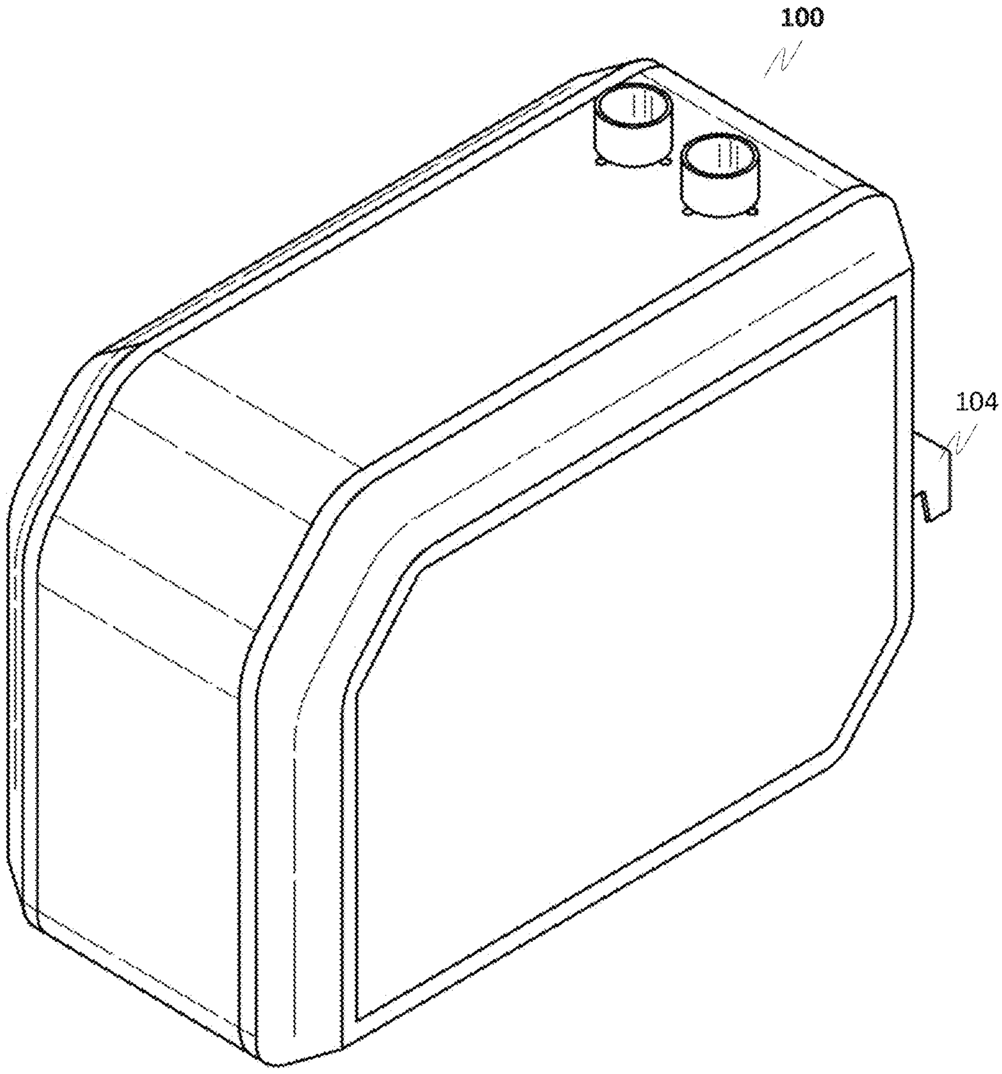
FIG. 1 shows an exemplary laser weeding module.

An exemplary laser weeder module 100 is shown in FIG. 1. One or more of these laser weeder modules 100 can be attached, via for example bracket 104, to a frame and then attached to a tractor, or other vehicle. The number of these laser weeder modules can vary based on such things as tractor load capacity, crop, row width, or the like. In general, there can be any number of laser weeder modules 100 either used as a stand-alone component or affixed to a frame as discussed in accordance with one exemplary embodiment.

Figure 2:
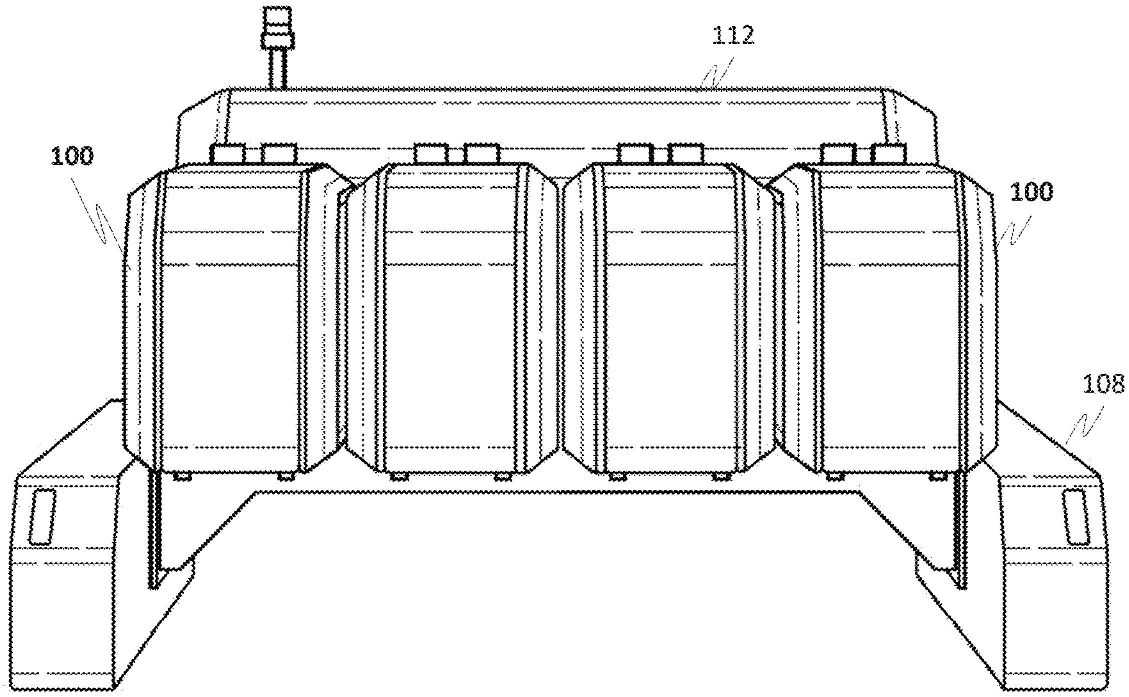
FIG. 2 shows a combination of a number of laser weeding modules on a single laser tool implement according to an exemplary embodiment.

For example, as shown in FIG. 2, there are four (or more) laser weeder modules 100 attached to frame 108, and the power dock 112. While a specific size and configuration of the frame is shown, the technology disclosed herein is not limited thereto and in general the one or more laser weeder modules can generally be affixed to any size/shape of frame without impacting the operation of the system.

Figure 3:
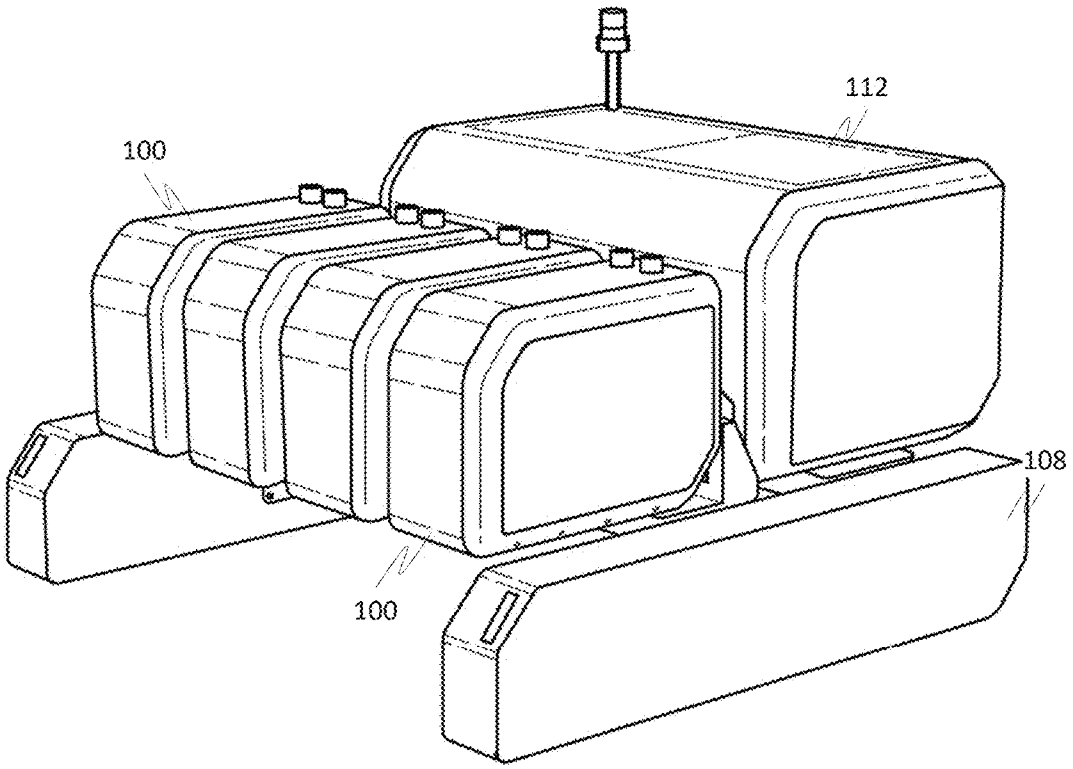
FIG. 3 shows a laser weeding assembly with four laser weeding modules, a power dock and frame assembly according to an exemplary embodiment.
Figure 4A:
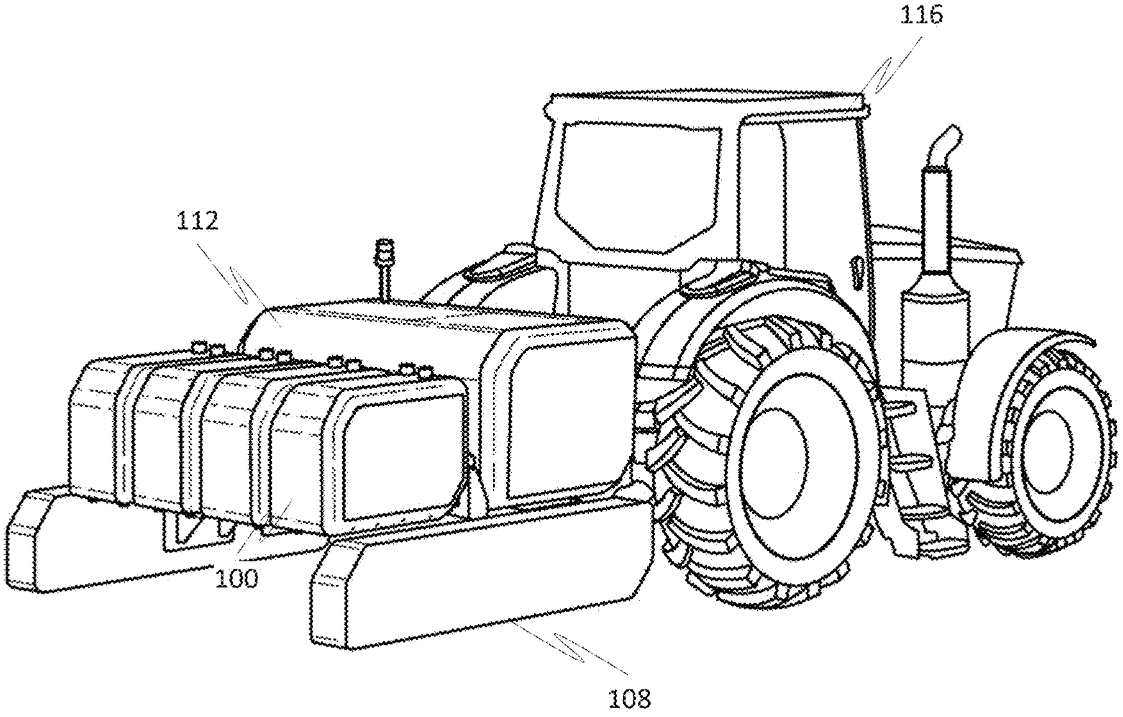
FIG. 4A shows the laser weeding assembly of FIG. 3 mounted to a tractor according to an exemplary embodiment.
Figure 4B:
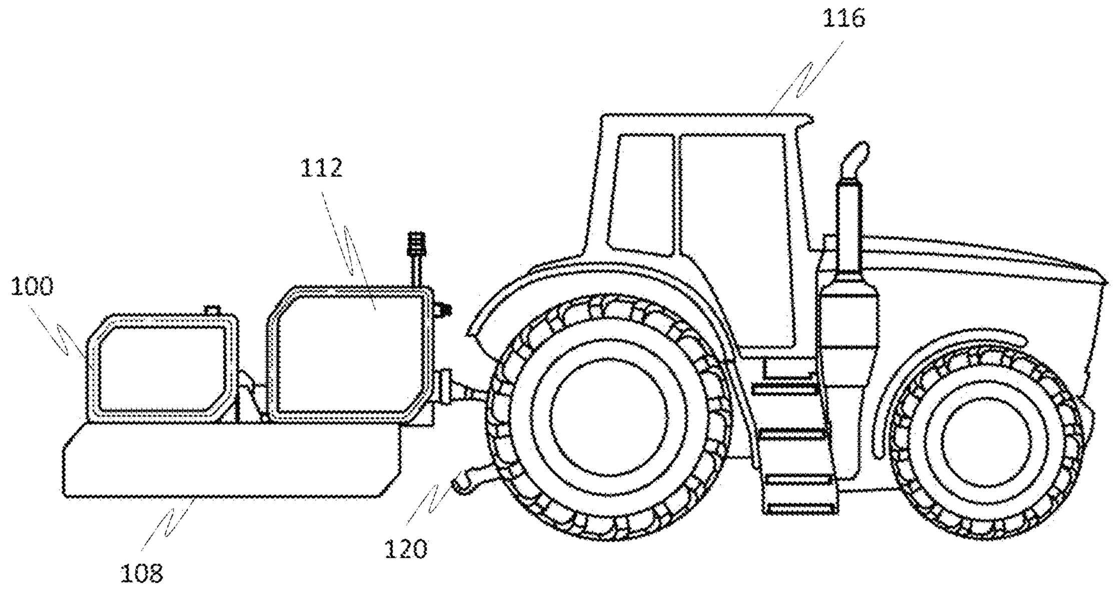
FIG. 4B shows another view of the laser weeding assembly of FIG. 3 mounted to a tractor according to an exemplary embodiment.

FIGS. 3 and 4A-4B show an exemplary use of the weeding system. The system can be mounted with a 3PH (Three Point Hitch) system (120) to any compatible vehicle 116 (tractor, robot, ATV, drone, etc.) and can be either with or without wheels, skids, tracks, or the like.

Depending upon the operating height required of the weeding application, the tool may be able to operate in fields with different crops, crop heights, and setups. For example, such a system can be operated in warehouses with vegetables production, seeded in rows or in open fields with row seeded crops or uniform seeded ones. In a warehouse example, the system could be mounted on a track, gantry, pully system or the like to allow the laser weeder 100 to traverse the rows of crops.

Figure 5:
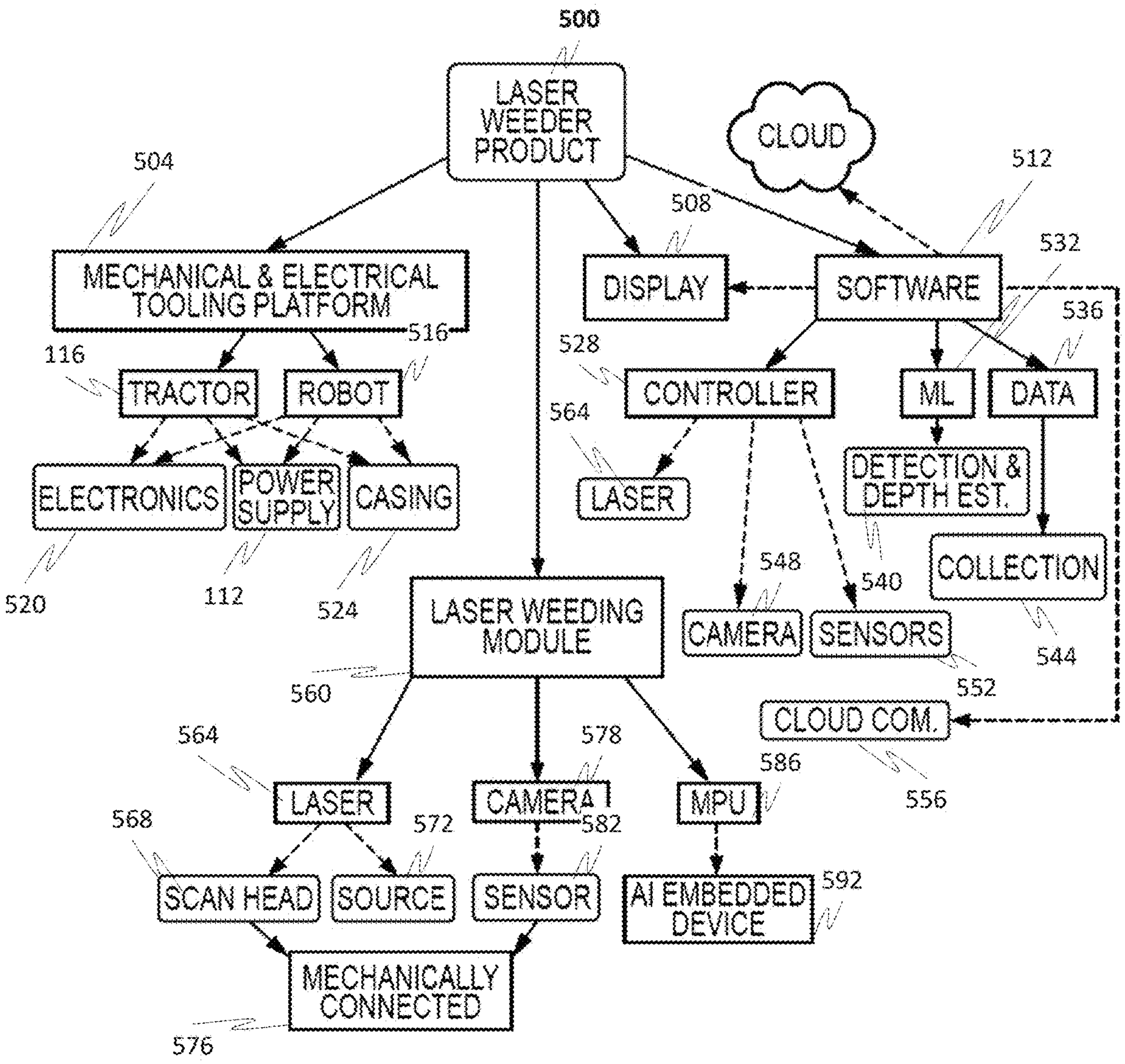
FIG. 5 shows an exemplary functional block diagram of a laser weeding system according to an exemplary embodiment.

A functional block diagram of the exemplary weeding system is depicted in FIG. 5.

The exemplary system 500 includes the mechanical and electrical tooling platform 504, the tractor or vehicle 116, the robot 516, and the electronics 520, power supply 112 and casing 524 as well as the physical and logical interconnections of the various components.

The system further includes software 512, display 508, controller 528, laser(s) 564, the electronic components 548 of camera 578, the electronic components 552 of sensors 582, the machine learning module 532, data 536, data storage 544, and a detection and depth estimation subsystem 540.

An exemplary laser weeding module 560 includes the laser(s) 564, scan head 568, 704/708, the laser source 572, camera(s) 578, MPU 586 (MPU (Microprocessor Unit) with integrated AI capabilities, often referred to as an AI MPU) and the AI embedded device 592. (See also FIGS. 7A-C)

Figure 7A:
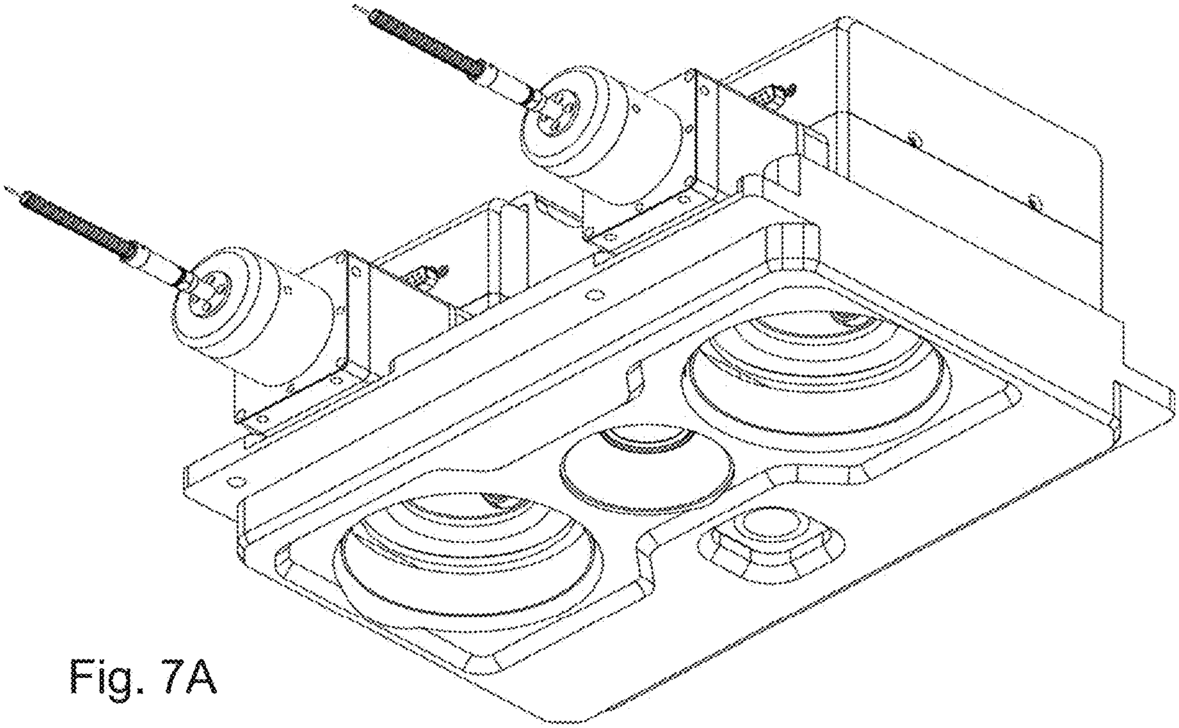
FIGS. 7A-7C show subcomponents of the laser weeding module according to an exemplary embodiment.
Figure 7B:
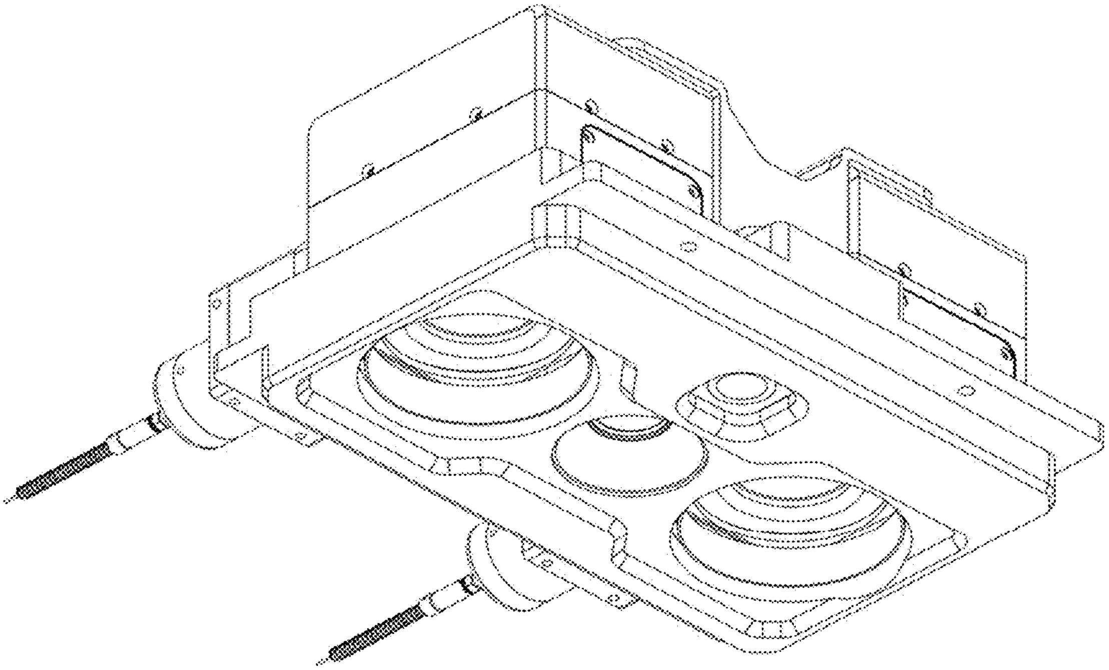
Figure 7C:
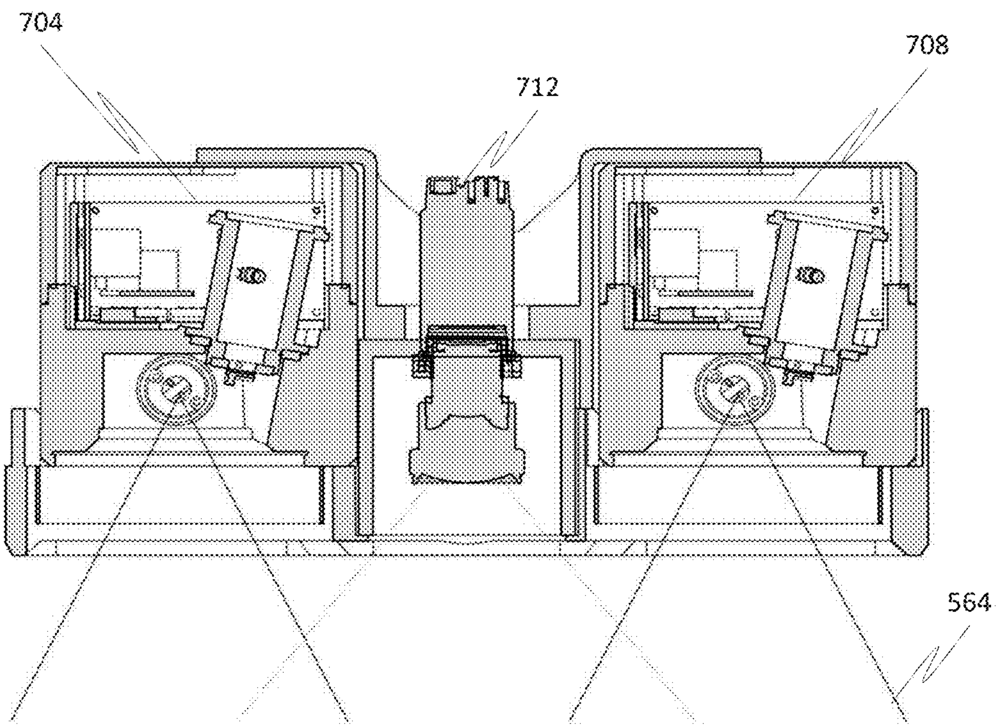

FIGS. 7A-7C show alternative visualizations from different views of one topology of two scanners (scan-heads)-left and right (704, 708), one camera 712 in the middle and in front of the camera the distance sensor.

On the back side—the two cables are the fiber cables that transmit the laser source. It's passing through the scan heads and then it's redirected with the scanhead mirrors to the desired target—getting signals from the single camera in the middle.

It also shows the sub-assembly which secures the position of the components in place (scanheads, camera and distance sensor) which is important to persist a valid calibration procedure and output The controller 528 comprises a processor (not shown), a memory (not shown), a user interface (displayed on display 508), a network interface (not shown), and one or more analog to digital converters (ADCs) (not shown). Controllers according to embodiments of the present disclosure may comprise more or fewer components than the controller 528. The controller 528 may communicate with one or more other components using the network interface, such as the display 508, a Global Positioning System (GPS) (or components thereof), and/or any of the various other components illustrated in FIG. 5. The controller 528 may also communicate with cloud resources such that some of the processing described herein is performed in the cloud with results of that processing returned to the controller 528, for example, to be displayed to a user. The controller 528 and one or more of the associated components are configured to process the various algorithms and processes discussed herein.

The processor may correspond to one or more computer processing devices. For example, the processor may be provided as silicon, an Application-Specific Integrated Circuit ("ASIC"), as a Field Programmable Gate Array ("FPGA"), any other type of integrated Circuit ("IC") chip, a collection of IC chips, and/or the like. In some embodiments, the processor may be provided as a Central Processing Unit ("CPU"), a Graphics Processing Unit (GPU), a microprocessor, and/or a plurality of microprocessors that are configured to execute the instructions sets stored in memory. Upon executing the instruction sets stored in memory, the processor enables various communications, calculations, comparison, and/or interaction functions of the system 100, and may provide an ability to establish and maintain communication sessions between communication devices over the communication network when specific predefined conditions are met. The processor may be embodied as a virtual processor(s) executing on one or more physical processors. The execution of a virtual processor may be distributed over a number of physical processors or one physical processor may execute one or more virtual processors. Virtual processors are presented to a process as a physical processor for the execution of the process while the specific underlying physical processor(s) may be dynamically allocated before or during the execution of the virtual processor wherein the instruction stack and pointer, register contents, and/or other values maintained by the virtual processor for the execution of the process are transferred to another physical processor(s). As a benefit, the physical processors may be added, removed, or reallocated without affecting the virtual processors execution of the processes. For example, processor may be one of a number of virtual processors executing on a number of physical processors (e.g., "cloud", "farm", array, etc.) and presented to the processes herein as a dedicated processor. Additionally, or alternatively, the physical processor(s) may execute a virtual processor to provide an alternative instruction set as compared to the instruction set of the virtual processor (e.g., an "emulator"). As a benefit, a process compiled to run a processor having a first instruction set (e.g., Virtual Address Extension ("VAX")) may be executed by a processor executing a second instruction set (e.g., Intel® 9xx chipset code) by executing a virtual processor having the first instruction set (e.g., VAX emulator).

The processor may correspond to one or many computer processing devices. Non-limiting examples of a processor include a microprocessor, an IC chip, a General Processing Unit ("GPU"), a CPU, or the like. Examples of the processor as described herein may include, but are not limited to, at least one of: AI NVIDIA® processor which is of the NVIDIA Jetson family, Qualcomm® Snapdragon® 800 and 801, Qualcomm® Snapdragon® 620 and 615 with 4G/5G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, Intel® Core® i7 family of processors, Intel® Core i9 family of processors, the AMD® FX™ family of processors, AMD® FX-4300, FX-6300, and FX-8350 32 nm Vishera, AMD® Kaveri processors, ARM® Cortex™-M processors, ARM® Cortex-A and ARM926EJ-S™ processors, other industry-equivalent processors, and may perform computational functions using any known or future-developed standard, instruction set, libraries, and/or architecture. The processor may be a multipurpose, programmable device that accepts digital data as input, processes the digital data according to instructions stored in its internal memory, and provides results as output. The processor may implement sequential digital logic as it has internal memory. As with most microprocessors, the processor may operate on numbers and symbols represented in the binary numeral system.

The memory, or storage memory, and database/collection device 544 may correspond to any type of non-transitory computer-readable medium. In some embodiments, the memory may comprise volatile or non-volatile memory and a controller for the same. Non-limiting examples of the memory that may be utilized in the system 100 may include Random Access Memory ("RAM"), Read Only Memory ("ROM"), buffer memory, flash memory, solid-state memory, or variants thereof. Any of these memory types may be considered non-transitory computer memory devices even though the data stored thereby can be changed one or more times. The memory may be used to store information about communications, machine operation, AI information, crop information, weeding operation, user information, farm information, diagnostic information, use information, compliance, history, and/or the like or in general any information about the system 100.

In some embodiments, the memory may be configured to store rules and/or the instruction sets depicted in addition to temporarily storing data for the processor to execute various types of routines or functions. Although not depicted, the memory may include instructions that enable the processor to store data into a memory storage device and retrieve information from the memory storage device. In some embodiments, the memory storage device or the data stored therein may be stored internal to the system 100 (e.g., within the memory of the system 100 rather than in a separate database) or in a separate server and/or in the cloud.

The user interface presentable on display 508 may correspond to any type of input and/or output device, or combination thereof, that enables a user to interact with the system 100. As can be appreciated, the nature of the user interface may depend upon the build out and operating environment of the system 100. Examples of the user interface may include, but are in no way limited to, user interface hardware and devices such as at least one touch-sensitive display elements, buttons, switches, keyboards, peripheral interface devices (e.g., mice, controller, joysticks, etc.). It is an aspect of the present disclosure that one or more devices in the user interface may provide an input that is interpreted by the processor in controlling one or more components of the system 100.

The communication network that connects the various components may comprise any type of known communication medium or collection of communication media and may use any type of protocols to transport messages, wired or wirelessly, between endpoints. The communication network may include wired and/or wireless communication technologies. The Internet is an example of the communication network that constitutes an Internet Protocol ("IP") network consisting of many computers, computing networks, and other communication devices located all over the world, which are connected through many telephone systems and other means. Other examples of the communication network include, without limitation, a standard Plain Old Telephone System ("POTS"), an Integrated Services Digital Network ("ISDN"), the Public Switched Telephone Network ("PSTN"), a Local Area Network ("LAN"), a Wide Area Network ("WAN"), a VoIP network, a Session Initiation Protocol ("SIP") network, a cellular network, and any other type of packet-switched or circuit-switched network known in the art. In addition, it can be appreciated that the communication network need not be limited to any one network type, and instead may be comprised of a number of different networks and/or network types. The communication network may comprise a number of different communication media such as coaxial cable, copper cable/wire, fiber-optic cable, antennas for transmitting/receiving wireless messages, optical/infrared, and combinations thereof.

A network interface (not shown) provides the controller 528 with the ability to send and receive communication packets or the like over the communication network. The network interface may be provided as a network interface card ("NIC"), a network port, a modem, drivers for the same, and the like. Communications between the components of the system 100 and other devices connected to the communication network may flow through the network interface. In some embodiments, examples of a suitable network interface include, without limitation, an antenna, a driver circuit, an Ethernet port, a modulator/demodulator, an NIC, an RJ-11 port, an RJ-45 port, an RS-232 port, a USB port, a WiFi or Bluetooth® port, etc. The network interface may include one or multiple different network interfaces depending upon whether the system 100 is connecting to a single communication network or multiple different types of communication networks. For instance, the system 100 may be provided with both a wired network interface and a wireless network interface without departing from the scope of the present disclosure. In such embodiments, the network interface may enable wired and/or wireless communication. In some embodiments, the system 100 may include different communications ports that interconnect with various input/output lines.

ADCs can also be used to convert analog signals to digital signals. The ADCs may be or comprise one or more integrated circuits (ICs) including one or more metal-oxide-semiconductors (MOS). The ADCs may receive analog measurements, readings, or other data from the various components. The ADCs may convert the received analog signals into digital signals, and pass the digital signals to the processor for further processing. The ADCs may include additional processing capabilities (e.g., digital signal processors (DSPs) and the like) and may filter, sort, or otherwise package the digital signals before sending the digital signals to the processor. Such organizing of the digital signal may reduce the computational time of the processor. In some embodiments, the controller 528 may additionally include one or more digital to analog converters (DACs) that convert digital signals into analog signals.

The database/collection 544 may be or comprise any tangible storage and/or transmission medium that participates in providing instructions to a processor for execution. Such a medium may take many forms, including but not limited to, non-volatile media, volatile media, and transmission media. Non-volatile media include, for example, NVRAM, or magnetic or optical disks. Volatile media include dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable medium is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The controller may optionally communicate with an IMU(s) (not shown). The IMU may be or comprise an accelerometer, a gyroscope, combinations thereof, and the like capable of detecting movement of a device or object to which the IMU is attached. For example, the IMU may be disposed on or near one of the weeding modules, such that movement of the weeding module is detected by the IMU. The IMU may then send measurements or other data describing movement of the weeding module to the controller 528 over the network interface. The received data may be processed by the processor to determine whether the movement of the weeding module acceptable, planned, or otherwise permitted (e.g., whether the movement occurred because a user directed the movement, or whether the movement occurred accidentally or unexpectedly). When the movement is unexpected, the processor may generate an alert send to the user device to inform the user that the weeding module experienced unexpected movement. Additionally or alternatively, the processor may send the alert to the GPS, and the GPS may augment the GPS positioning output (e.g., the measured latitude, longitude, and/or elevation) based on the alert to indicate the determined roll, pitch, and/or yaw of the system. In other words, while the GPS may output measurements or other determinations of the location and elevation above sea level of the system 100, the processor may use the data generated by the IMU to correct the GPS measurements to account for effects of a sloped ground, of an operator tilting the system 100, combinations thereof, and the like.

An optional GPS may include one or more sensors configured to utilize a satellite-based navigation system including a network of navigation satellites capable of providing geolocation and time information to a user and/or the system 100. Examples of the sensors as described herein may include, but are not limited to, at least one of Garmin® GLO™ family of GPS and GLONASS combination sensors, Garmin® GPS 15x™ family of sensors, Garmin® GPS 16x™ family of sensors with high-sensitivity receiver and antenna, Garmin® GPS 18xOEM family of high-sensitivity GPS sensors, Dewetron DEWE-VGPS series of GPS sensors, GlobalSat 1-Hz series of GPS sensors, other industry-equivalent navigation sensors and/or systems, and may perform navigational and/or geolocation functions using any known or future-developed standard and/or architecture. The GPS may enable the user (or an autonomous vehicle) to determine the geolocation of the system 100, such as when the system 100 is coupled with or part of a vehicle or other mobile device. In some embodiments, the GPS may pass along the geolocation information through the network interface to the user device, storage 544 the cloud, or the like.

The mechanical and electrical tooling platform 504 is made up of various components that are used in conjunction with the laser weeding module.

The display 508 can be integrated within the weeding system, or it may be linked to the weeding system via a wired or wireless link and mounted in, for example, the tractor. In an exemplary embodiment, the display is inside the tractor giving access to the tractor operator to observe the display and act accordingly (e.g., start, stop or tune the system).

The software 512 comprises a combination of software (libraries like ROS and PyTorch) as well as the laser-camera controller module alongside its optimizations, the integration of AI object detection or segmentation models adapted to the specific problem needs and the novel implementation of the depth estimation pipeline for the full 3D surface modeling below the weeder tool.

Figure 6:
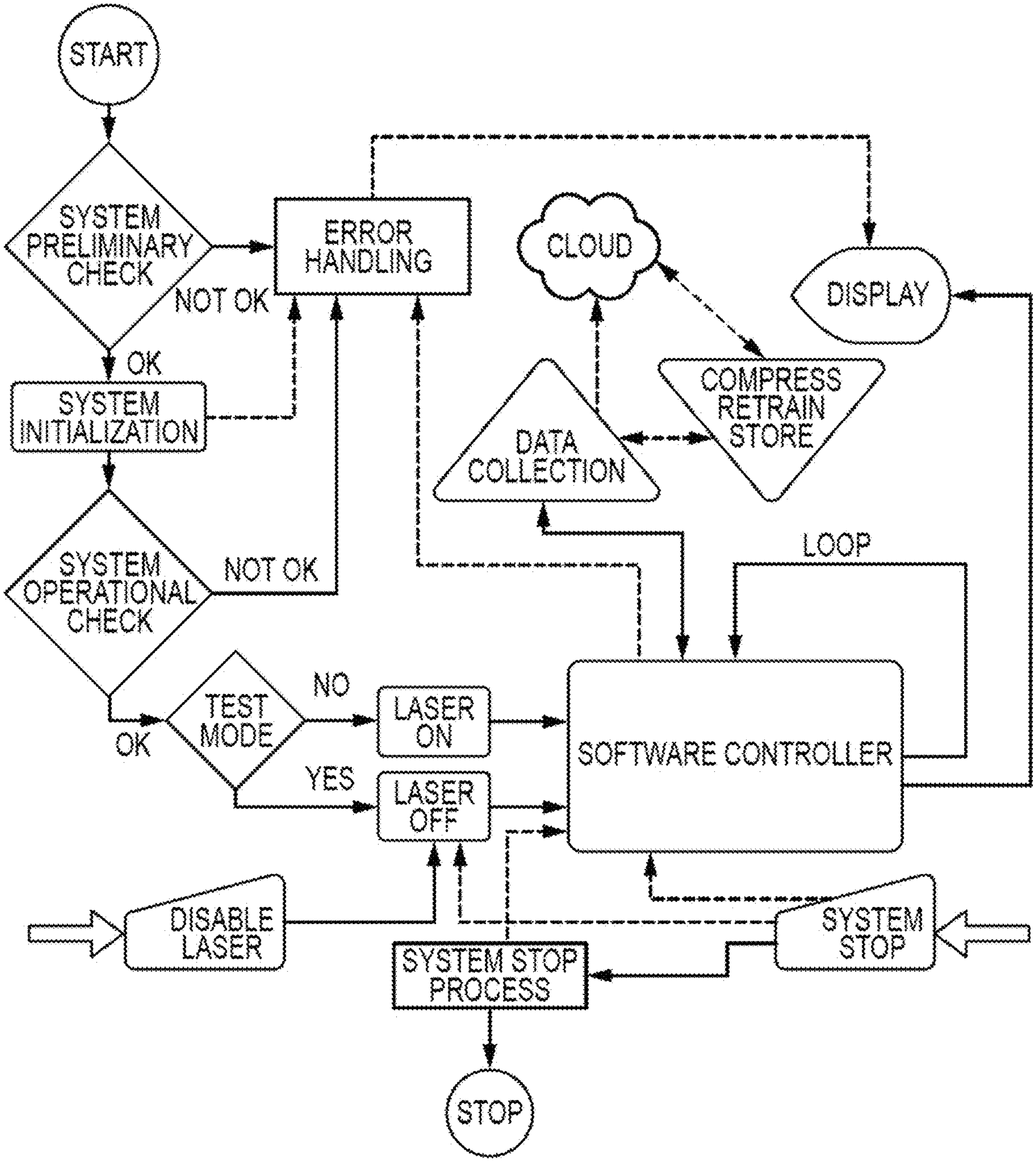
FIG. 6 shows an exemplary flowchart depicting initialization and steady state operation of the laser weeding system according to an exemplary embodiment.

In an exemplary operation, there are initialization tasks and steady-state tasks. FIG. 6 provides an overview of these tasks.

Initialization Tasks: These are performed when the system first starts up. In detail and prior to any further execution the system ensures that all the components are working as expected and everything is in a good operating state. Sensors are checked regarding the validity of their output; laser source mode and state are checked both for operational and safety reasons and finally a predefined laser-moving pattern can be executed to make sure that the laser-targeting is calibrated and satisfies the required accuracy for the task.

Steady State Tasks-Once initialization is complete, the system enters its steady state of operation. At first it checks the mode that the system should run-a) Test mode means that the full-powered laser beam is disabled so one can operate the laser (pilot laser beam) for maintenance, inspection or debugging. In this mode the rest of the system works as usual except that the laser beam is one with very limited power (1-5 mW) as also in the visible spectrum so the operator or the developer can easily see where exactly it is placed in the ground. b) In the non-testing mode, the full-powered laser beam is enabled and thus the operator or the developer should be extra careful while the system is operating under this mode. This mode is the regular operating mode.

The system in its Steady State runs in a loop receiving new information and plans the desired actions. The data collection capabilities collect data both from the sensors and by the software execution itself. The data collection subsystem provides the relevant software components with the available (most recent) information (e.g., images, sensor measurements, diagnostics etc.) and also retrieves the information from the software and optionally uploads this information to a main server for long-term storage, real-time system monitoring and real-time web-server visualizations.

Another aspect of the system's operation includes the online retraining of the AI target detection model. The system after a specified period of operational time, with the collected data, executes an on-device model retrain and upgrade. This includes an intelligent process of data collection and sampling, an on-chip model retraining and an instant new model deployment. This process transmits the relevant model evaluation data to the server for logging and also tracks of the updating process and the performance of the models. There is also an additional part to this process which decides when it's better to update the current model with a new one considering the relevant performance metrics. This lets the system "evolve" in a way that it safely accumulates knowledge and improves its performance in an incremental and long-term way. To apply this in practice, advanced transfer learning and knowledge distillation machine learning techniques are applied on the AI models.

The software controller 528 contains all the logic for data management and decision making. It handles all the sensor communications and uses all the relevant software components (Target detection, Camera-Laser commands transformation, Calibration region information, Surface depth information, Optimal laser targeting etc.) to execute the end-to-end task.

There are also two external triggering points for the software to immediately get the system in a safe state. An external trigger guarantees that the laser source will be immediately disabled, and another external trigger guarantees that the whole system will be shut down immediately when certain criteria are met.

The laser weeder leverages artificial intelligence (AI) algorithms to detect and identify the targets (in the laser weeding application specific plants/weeds that are to be eliminated) that the laser will hit. The algorithms also calculate the 3D reconstruction of the scene (surface depth information) using a single monocular camera. The algorithms run on an embedded AI computer in real-time.

Next, the object detection, depth estimation, laser controller, depth error targeting correction formulas and the optimized parallel execution pipelines will be described which are used to detect and identify a weed, calculate the relevant transformations from the camera-laser frame to the world frame and properly aim the laser spot to eliminate the detected target effectively.

One goal of the system is to first identify the desired targets using digital images as the primary source of input, calculate a mapping between pixel coordinates and scanhead commands (laser targeting), so that the laser can be pointed to the desired area (that lies inside the laser Field-Of-View) by just knowing the pixel coordinates of that point in the captured image.

Direct Diode Laser Source

This type of laser source has the benefit that it is largely maintenance free, more compact and much more energy efficient than other available lasers, such as CO2 lasers. Additionally, using direct diode lasers is unique regarding the laser weeding application. A major requirement for effective laser weeding is to transfer as much energy (heat) with the laser beam spot through the leaves and the stem of the weeds to their roots to eliminate them. A direct diode laser source is ideal for this scenario as it does not instantly burn the weed and thus the situation where a single leaf or a part of the weed has been cut off is eliminated. In such a scenario the rest of the weed remains unaffected and thus it will survive and in the next couple of days will start growing again.

Additionally, the desired amount of power to transmit to each weed considering its type, shape and size should be determined. This can be done by both controlling the power of the laser source by itself (reducing or increasing it accordingly) or changing the "hitting pattern" (specific movements that the laser beam spot does when targeting a single target weed). The "hitting pattern" has thoroughly been investigated and tested for the specific application and for this the system includes an algorithm which automatically adjusts the horizontal and vertical movements of the laser beam (the pattern) considering the size of the target and also the velocity of the system. Additionally, the spot size is also varied using the direct-diode lasers based on any of the above criteria. To satisfy the requirement to not cut-off parts of the weed but transmit as much energy as possible to the roots of the plant, a well selected spot size (2-10 mm) is important that when combined with the power and the hitting-pattern optimizations significantly improves the overall performance and the effectiveness of the system.

Object Detection/Segmentation

A dedicated neural network architecture is used within the system to execute the object detection and/or segmentation tasks. The network is trained with datasets for optimal performance. For the training process one can use labeled data, collected from realistic conditions such as field tests under many different crops, places and conditions. An optional automated process (with a human in the loop) can also be used to label the data and thus increase the accuracy of the model in an incremental approach (ML-Incremental Learning techniques). The model can further be optimized to run as fast as possible in the selected dedicated hardware since this plays a crucial role on the targeting mechanism and on the total efficiency of the weeding task. In accordance with one exemplary implementation, and to have an optimal execution flow with the system, the model should run the inference process in less than or equal to 8 ms with an input image size at least 1.5M pixels. However, this may change based on, for example, operating environment, types of weeds and/or hardware implementation.

Enhanced Weed Detection Through Optimized Optical System

The laser weeding system employs an image sensor 582 characterized by a high dynamic range (HDR), enabling accurate weed identification under the variable lighting conditions inherent to agricultural environments. The sensor's ability to capture detailed images across a wide range of light intensities ensures reliable weed detection, even in situations with strong shadows or bright sunlight.

Optionally, the system can be equipped with one or more lights (white light, IR light, or the like) to assist with nighttime operation and weed identification.

Specifically, the image sensor exhibits a dynamic range exceeding 120 dB, ensuring robust performance across diverse illumination scenarios.

To mitigate interference from reflected laser light, an optical filter (not shown) is integrated into the system. This filter is specifically designed to attenuate light within the spectral range of the direct diode or fiber lasers used for weed elimination, which operate at a wavelength near 900 nm. The filter exhibits a steep cutoff characteristic, effectively blocking light above 690 nm while maintaining high transmission in the visible spectrum. This ensures that reflections from the laser beam do not saturate or interfere with the image sensor, allowing for continuous and accurate weed tracking during laser operation.

The synergistic combination of the high HDR image sensor and the specialized optical filter enables robust and reliable weed elimination under very challenging and harsh conditions. The high HDR ensures accurate weed identification under varying lighting conditions, while the spectral filtering prevents laser reflections from disrupting the tracking system. This optimized optical system is one key aspect of the system's ability to operate autonomously and efficiently in real-world agricultural settings.

Depth Estimation

A pipeline is used to estimate the surface dense depth map from a single camera view (note that one exemplary embodiment uses only one camera). A neural network architecture and 3D vision techniques are used to reconstruct the 3D model of the scene from monocular camera frames. The reconstructed 3D scene model is further processed in a post-processing step which allows the system to obtain the dense depth map of the scene. This post-processing step also utilizes the distance sensor to refine the calculated dense depth map. This is described in further detail below (Depth Error Targeting Correction formulas).

Laser Controller

A pipeline is also used to identify the desired weeds, transform the pixel coordinates into laser commands (scanhead positions), and optimize their targeting (ordering, path, total affected weeds, laser power per weed, dwell time per weed, hitting-pattern per weed etc.), and finally enable (aim) the laser source to hit the weed. The system optionally also considers the speed at which the vehicle is moving (from the GPS, from the vehicle itself, through a ground speed sensor, through computer vision techniques and neural network algorithms (motion flow), or the like) to predict the exact position of the detected target at a point in the future and move the laser beam accordingly. This process can be very accurately performed by the different parts of the software flow process to calculate the exact displacement of the targets in the real-world coordinates relative to the captured information from the sensors. This diminishes any "lagging" effect that could appear in laser targeting when the vehicle moves.

Another important aspect is the calibration process. This enables the system to simplify the construction requirements and solve the challenges using software (which is "zero-cost" and much easier to maintain) as opposed to hardware. Calibration is an important process, and the system employs a technique that enables it to be performed efficiently and even in the field.

In contrast to an improved calibration technique, typical third-parts systems can include the following exemplary steps/requirements:

Laser source to scan-head calibration: Prior systems need to align (with very high precision) the laser beam to pass through the center of the laser path tube and then directly inserted into the center of the scan-head input pipe.

Exact position of the scan-head relative to the ground (distance from the ground and relative orientation). Extremely accurate sensors are needed to satisfy this requirement, using, for example, very well calibrated, robust and noise free inertial measurement units (IMUs).

Exact position (translation and rotation) of the camera relative to the scan-head. This requires a very strict manufacturing process which requires expensive molds.

Scan-head motors calibration—this is required to calculate the relative error of all scan-head positions for its motors.

An overall requirement for a very strict manufacturing process with extremely high accuracy and a very low tolerance for faults. Without this, measurements relied upon in the design are not aligned with the real measurements after the construction and the assembly process. This has a consequence that even some very (relatively) small errors (e.g., less than one millimeter) could produce very large errors in the actual laser targeting.

Another challenge is that if any of the above elements are not satisfied, the system could need maintenance to make exact measurements of all the relative positions of the system components (as explained above).

Figure 8:
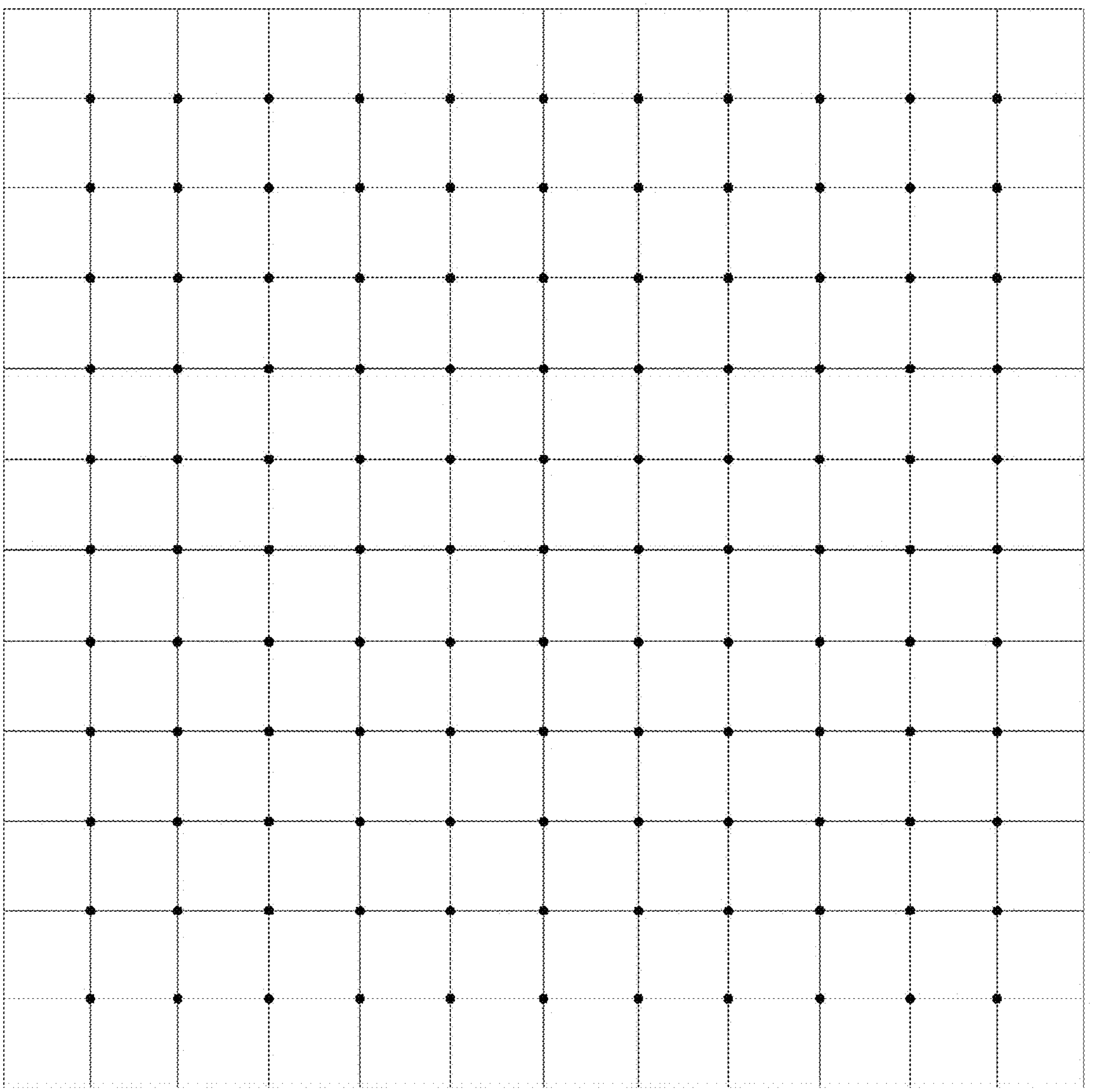
FIG. 8 shows the calibration pattern used to relate image pixel regions to laser scan head commands according to an exemplary embodiment.
Figure 9:
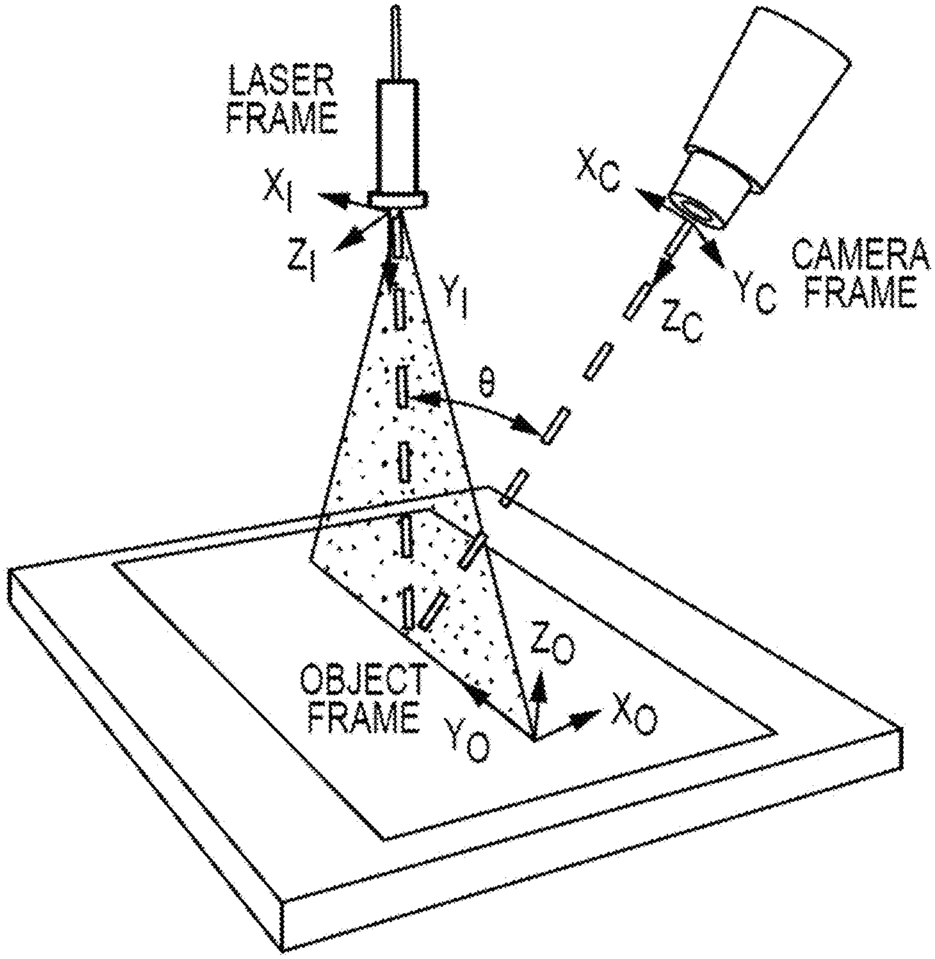
FIG. 9 shows the different coordinate systems and perspectives of the scenes for the different parts of the embodiment (camera, scanhead etc.) according to an exemplary embodiment.

However, in more detail, the exemplary calibration process calculates a comprehensive mapping between pixel coordinates and scan-head commands—that is, commands that direct the laser beam to hit the target. The system performs calibration across multiple small regions (squares) in the image as is visualized in FIG. 8. And in FIG. 9., the relation between the camera frame and the laser frame for calibration is shown, while also considering real world coordinates on the object frame.

In an exemplary embodiment, for each region, the system calculates a specific transformation between pixel values and scan-head values that corresponds only to that region.

All the calculated region-specific transformations are saved in a look-up table which is used in real-time, during the laser targeting process. The pipeline works as follows: The target is detected in a specific region (pixel coordinates) in the captured frame. The software automatically decides the region-id that corresponds to that object region. The software loads the corresponding region-specific transformation from the look-up table. The software uses the loaded transformation to map pixel coordinates to scan-head values (laser targeting).

The calculated transformations are valid for the specific distance (from the ground) that the camera and the scan-head (mounted together as a single component) were at during the calculation process and their relative position and orientation (camera to scan-head mount). This is due to perspective changes to the camera at different heights. For this process to be valid at different/multiple heights, one approach would be to perform the calibration process multiple times, one for each specific height. In this case, during execution time, one would decide at which specific height the detected target is and then look-up the relevant transformation. In one embodiment, this challenge was overcome by using trigonometry and some mathematical formulas (see "Depth Error Targeting Correction formulas" below) so the calibration process needs to be done only once during system assembly and is valid as long as the relative position of the camera and the scan-head remains the same or constant.

It is important to note that the mapping between pixel coordinates and scan-head values is not strictly linear. To address this, a specific algorithm is used to capture not only linear relationships between pixel coordinates and scan-head commands, but also the non-linear ones, which are mainly introduced by lens distortions (mostly on the edges of the frame). Moreover, the laser beam is directed using two step motors which by themselves may have non-linear behavior in their range of operation. Accounting for these non-linearities with a single transformation via the calibration process is critical for accuracy (mm level accuracy), and it simplifies a lot the operational and construction requirements for any camera-laser system with a similar operation (target detection and hitting)

Figure 11:
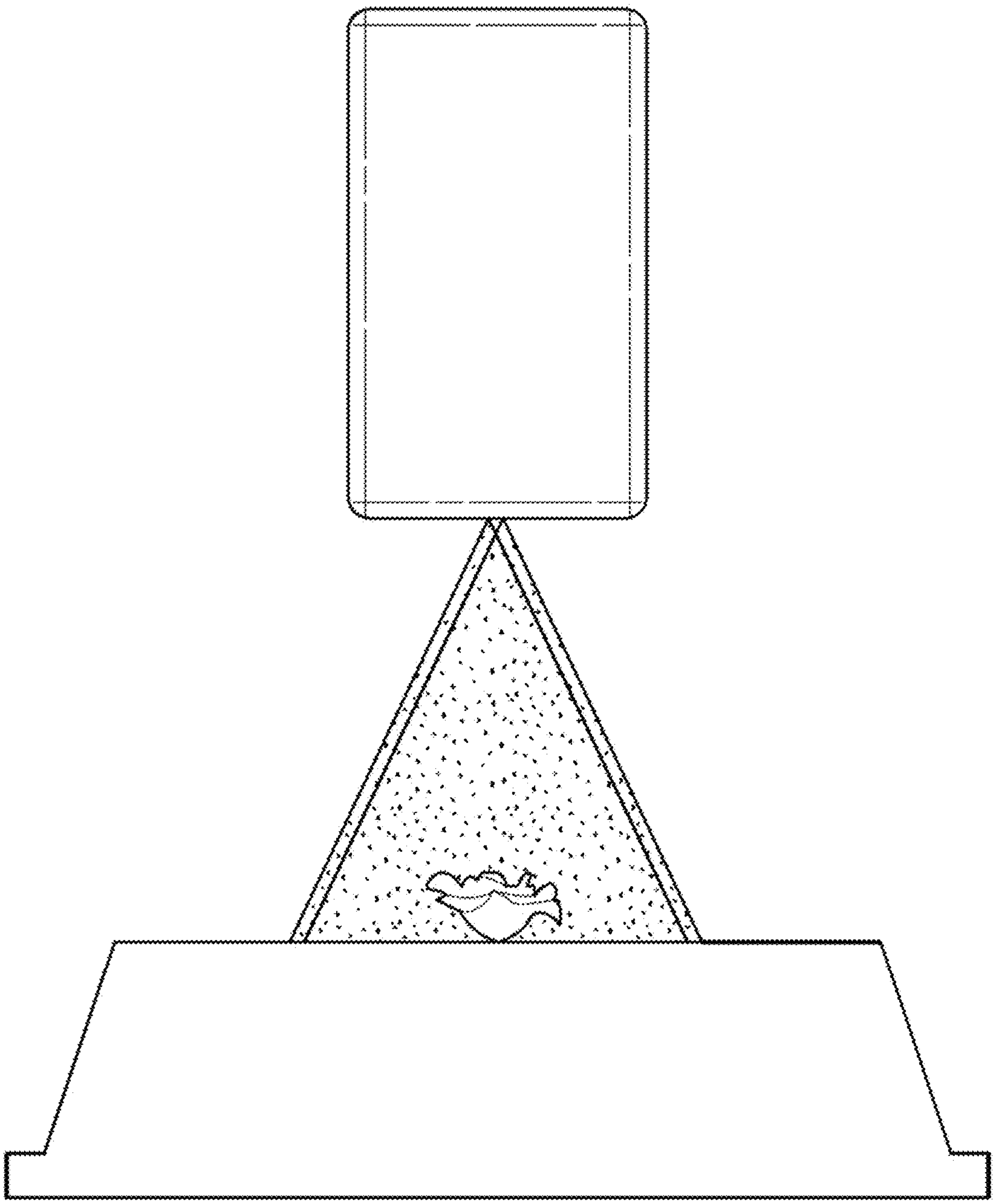
FIG. 11 shows two laser sources covering an overlapped field-of-operation according to an exemplary embodiment.

Another novel addition to the laser weeding application is the double lasers setup. The exact embodiment for a single laser module is visualized in FIG. 11.

The software controller has an intelligent software (mode) implementation which decides between the following two cases: a) If a target (e.g. a weed in our application) is big enough and requires extra energy to be killed in the pre-selected hitting time window then the controller redirects both laser beams to the same target b) in other cases the controller decides that each laser source will be directed to a different target in order to increase the overall operational speed of the laser weeding application (increased target hitting capacity). Using this optimized setup it has been determined that the exemplary system could execute the laser weeding task with speeds up to 1 km/h by hitting up to 130 targets with a single laser weeding module for a dwell time of 100 ms.

Depth Error Targeting Correction Techniques

Instead of performing the calibration process multiple times at different heights, storing all the calculated transformations and retrieving the most suitable one during execution, an exemplary embodiment uses two mathematical formulas, which, given a calibration transformation at a known height, can be used to accurately calculate the scan-head values that are required to hit a target that may appear at any different height. This approach completely alleviates the need for performing the calibration process multiple times.

Figure 10:
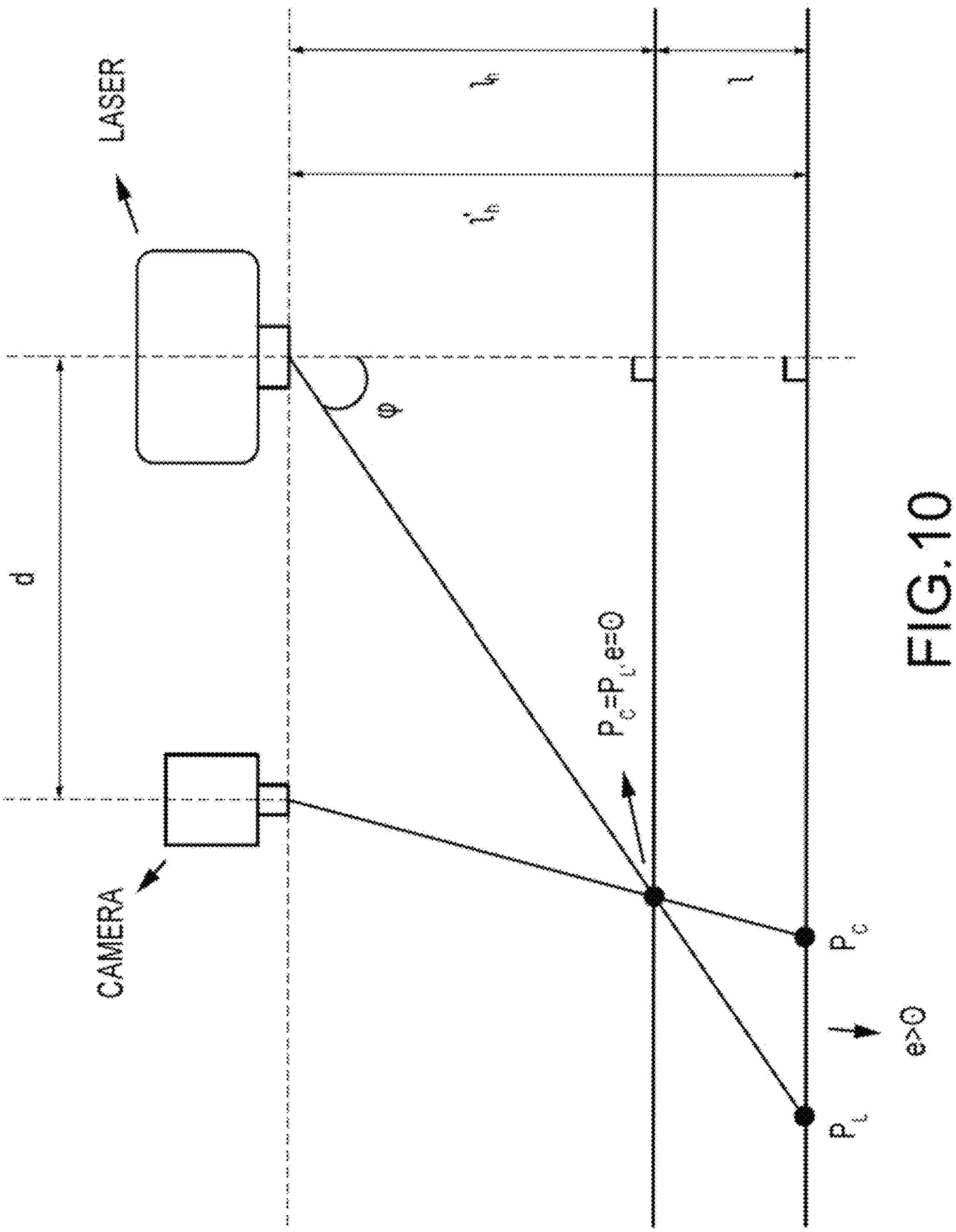
FIG. 10 shows a laser targeting correction example according to an exemplary embodiment.

With reference to FIG. 10, let d be the distance between the camera sensor and the laser scan-head (center-to-center). If the laser scan-head is placed on the left side of the camera, d is negative. Correspondingly, d is positive when the laser scan-head is placed on the right side of the camera. If both the camera sensor and the laser head cast rays in directions such that they intersect at some point, one can define the intersection point of those rays with a horizontal plane/line that is perpendicular to the camera-laser setup and at height $l_h$. For the camera, that intersection point is denoted as $P_C$, while for the laser, the corresponding intersection point is denoted as $P_L$. Also let e be the distance between these two points ($P_C$, $P_L$). By performing the calibration process at height $l_h$ and for given d, one can assume that $|e|=0$. This means that if a detected target is at height $l_h$, one can use the calculated transformation to perfectly hit the target with the laser. However, if a target appears at a height $l'_h$ that is different from $l_h$ (where the calibration was performed), then $|e|$ increases ($|e|>0$). This means that the laser beam will not accurately hit the target. In this case, e is calculated as follows:

$$e = d\frac{l}{l_h}$$

where $l=l'_h-l_h$. Now that e has been calculated, one can proceed with calculating the new appropriate scan-head values that are needed to accurately hit the new target that lies at height $l'_h$. To achieve this, one first needs to calculate the angle in degrees in which the laser beam should be turned to. If q is the angle between an imaginary ray that comes out of the laser head and is perpendicular to the horizontal plane/line and the initial actual laser ray (positive is anticlockwise), one can calculate the new angle q' that would minimize $|e|$ ($|e|\approx 0$) as follows:

$$\phi' = \arctan\left(\tan\phi + \frac{e}{l'_h}\right).$$

Finally, translate the calculated φ' to the actual scan-head values, which is trivial. All the steps described above are automatically performed by the embedded software, without the need for any adjustments, as long as the relative position and orientation of the camera and the scan-head remains the same. And even if the relative position or orientation changes, only minimal adjustments are needed, which can be easily performed remotely on-site at the client site. Importantly, the described procedure has been tested in multiple realistic scenarios and delivered accurate results. The test scenarios included cases where the target was both at the positive and the negative regions of laser targeting angles. Also, it has been tested for the cases where the height that the target lies was both smaller and larger than the height where the calibration process was performed.

In summary, the unique combination of calibration process and depth estimation calculation enables the system to accurately and rapidly target objects at different heights, requiring only a single calibration process performed once during system manufacturing.

Another important aspect is the way that the system uses the calibration information and the depth error targeting correction formulas in real-time. During the manufacturing process one calculates the transformations for all regions in the camera field-of-view. These are saved in a look-up table using the corresponding height as the initial key, and the calculated transformation as the actual value for each pair.

These values are then loaded on system initialization and are ready to be used during execution.

Figure 12:
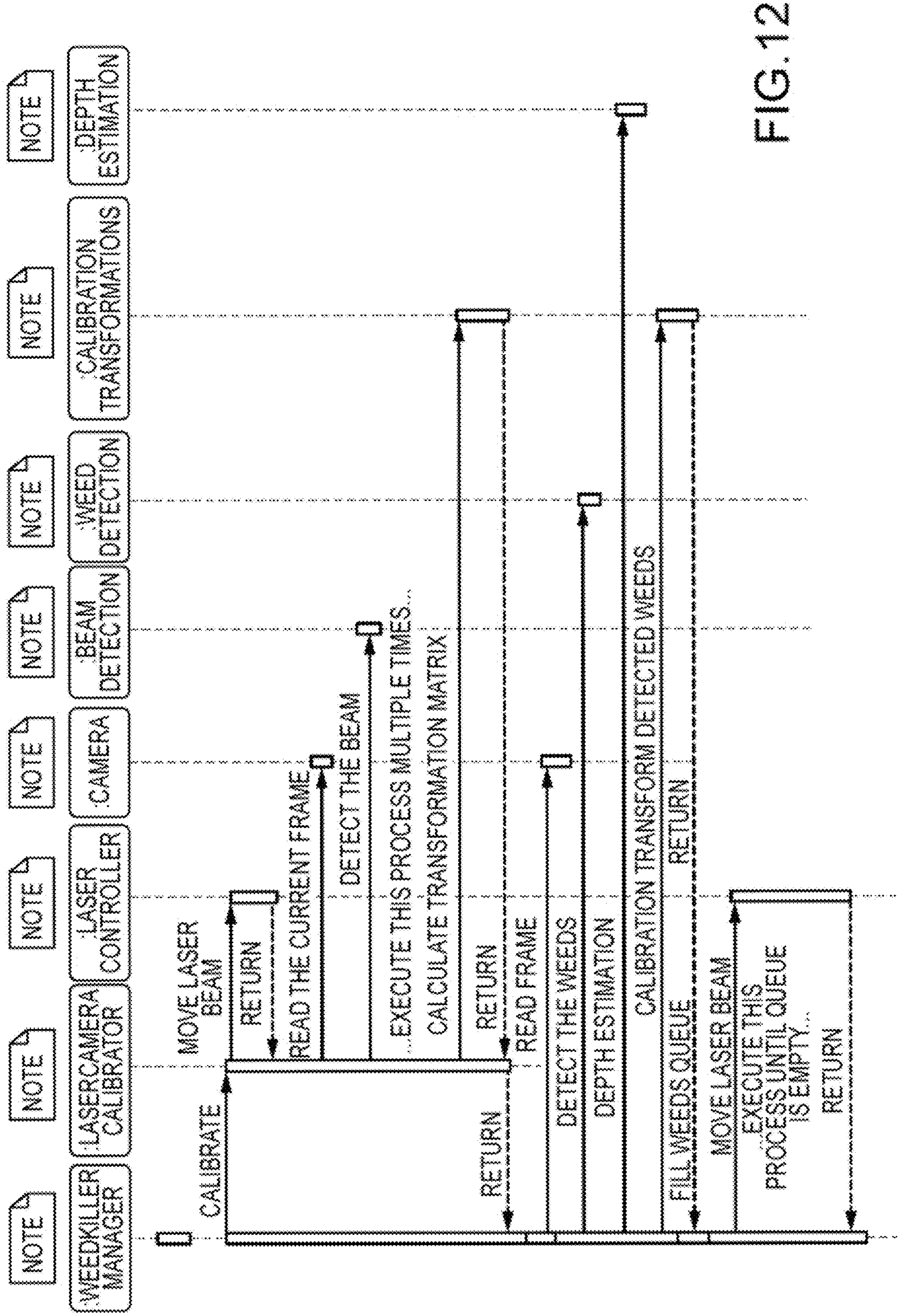
FIG. 12 shows an exemplary calibration/transformation process flow according to an exemplary embodiment.

FIG. 12 provides a visual representation of the calibration process (executed only once during the product manufacturing process-upper part) and the detection and targeting process which is happening in real time for any given input image frame (lower part) during product operation.

Above it was described how the algorithms/processes were used to detect and target weeds largely assuming a single captured camera frame.

In practice, the object detection algorithm processes multiple sequential camera frames and finds the objects of interest in any given scene. These detections are then published to the targeting algorithm. This process needs to be able to operate very fast (e.g. <8 ms) because the more delays in this process the more shift will have occurred between the detected objects and their real/actual position.

As an example: imagine the case where the system grabs a new frame at time t from the camera. It is passed (let's assume immediately) to the detection algorithm. The detector starts processing the frame and needs some milliseconds to produce the detections. Given that the system is moving with a "known" velocity (while it's almost impossible to have constant velocity in the field while using a tractor, it is at necessary that there is confidence that it lies within a specific range for this application), after some milliseconds the real targets (in the real world frame) will have moved from their initial position. This means that the faster the system can execute the detection process, the closer the detected object coordinates will be to the actual position. Note that the real-world accuracy is also affected by the Targeting algorithm speed.

To this end, an exemplary embodiment uses a specific neural network architecture, which satisfies the accuracy and speed requirements, and is further optimized to run on specific hardware (using e.g., a specific AI embedded chip from Nvidia®) to produce incredible fast results. To give this perspective, the optimized model runs ×10 faster than the initial one. This super-fast implementation also contributes to the value added to the technology since the system can execute the targeting task with extremely high accuracy in moving targets.

An alternative approach is to use motion flow estimation algorithms to account for this shift, as well as using a second "layer" of cameras to pre-detect the targets (weeds) and then have some time to prepare the "in-motion-targeting" process.

This approach requires a very accurate and stable motion (velocity) estimation (extremely difficult to be satisfied for the desired accuracy range in an outdoor field application using a tractor). Estimating it via hardware (sensors), software (motion flow algorithms) or a combination of them includes in any case an additional source of error and is prone to sensor noise, estimation error and instabilities (unstable and inconsistent measurements and estimations).

In practice, the targeting step requires that, for each detected object, the system uses the calibration transformations look-up table to transform pixel coordinates (detected objects) to laser scan-head directional commands. The final transformation, and thus the actual scan-head commands, is affected by the depth (distance between the camera-scan-head plane to the specific object region that we want to target) and the image frame region where the detected object exists.

In an exemplary embodiment, there is an absolute distance measurement sensor. This sensor is used to know the exact distance of the system (camera-laser frame) to the ground. This is a novel addition for the end-to-end depth estimation pipeline to increase the robustness and to minimize the error-shift in the 3D scene reconstruction. Depth estimation algorithms and models are very robust in measuring the relative depth changes within a scene, but in many cases and very often they fail to accurately calculate the real depth measurement of the real world unless they are specifically trained with the same or very similar environmental data. This mainly comes from the fact that these models have been trained with different data than the environment in which they are deployed and specifically in our case where one deploys them in a harsh outdoor environment (open fields). Adding an absolute distance sensor gives the system the ability to exploit the very accurate relative depth estimations from the AI model and scale them considering the absolute distance sensor measurement-thus being confident that the final 3D surface reconstruction remains accurate and robust under any circumstance. Finally-having the absolute distance sensor integrated in the software controller pipeline gives another layer of safety in terms of system performance, since it is used to filter out outlier values or wrong estimations from the depth estimation AI model With the refined dense depth map (using the absolute distance sensor and the AI depth network) the system can calculate (using the Depth error targeting correction equations) the exact targeting position for each object, since the exact 3D coordinates in the real world of each target is known (thanks to the dense depth map). The only requirement is the calibration transformations that were calculated at height $l_h$ and the real value of $l_h$. By following this procedure, one can avoid having multiple calibration transformations for multiple heights, which will be very time consuming and complex during the manufacturing process as it depends on the selection of the height steps.

Specifically, the fewer steps that are performed in the calibration process (multiple representative heights of the system to the ground) the faster and easier the calibration, but the less granularity one has (e.g., for example if one calibrated at 10 cm with a step of 2 cm and the object depth is 11 cm—in this case the look-up calibration transformation will by definition have an approximation error of 1 cm-which considering the accuracy requirements is very critical and impactful). While with the "Depth error targeting correction equations" one can calibrate at 10 cm and very accurately "simulate" the transformations for depth e.g., 11.35 cm.

Optimized Parallel Execution

Another important aspect is the ability to perform tasks in parallel, thus optimizing the execution of multiple steps. Detection and laser targeting execution are taking place in parallel and asynchronously. This is designed and implemented this way to "fill-in-the-gaps" between the sequence of detection and the targeting processes (known as prefetching or buffering procedure).

Figure 13:
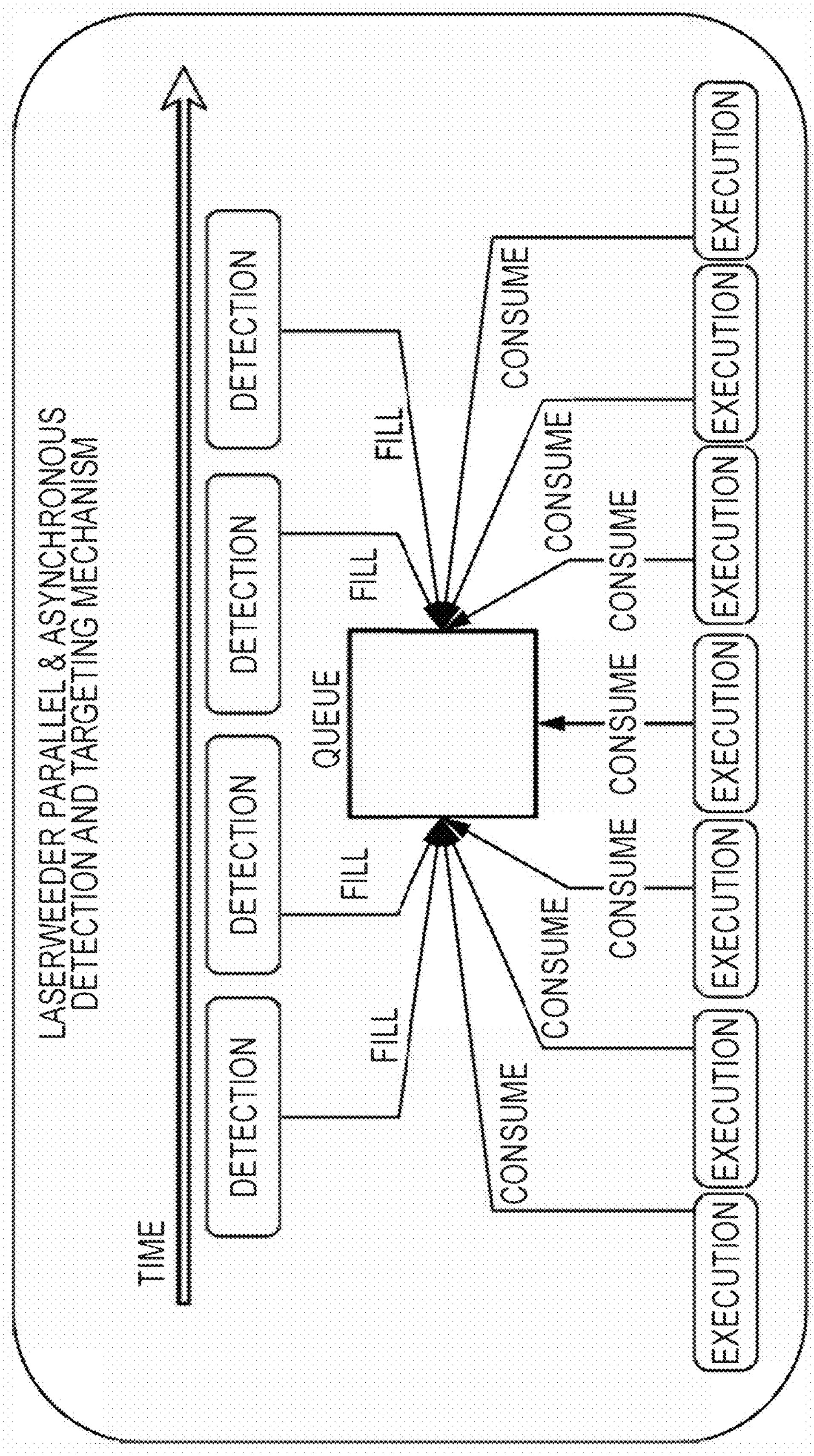
FIG. 13 shows the operational flow of detection and targeting in parallel according to an exemplary embodiment.

As seen in FIG. 13 there is zero (or near zero) delay between consecutive detections and executions. On the other hand, in a synchronous approach (detect->execute->detect->execute . . . ) the gaps between consecutive executions would be at least as long as the detection window. With this approach (parallel detection and targeting)—the system targets a specific object for x-milliseconds (e.g., 100 ms) and during that period the system very accurately updates the targeted position multiple times (e.g., every 10 ms by utilizing the extremely fast detection model) using the new/updated detections (object position and scan-head commands) for a specific target. After the x-millisecond window, the system moves on to the next valid object that must be targeted and has been inserted into the queue In the scenario where a weed is not initially seen from the camera sensor—it may not be able to be immediately targeted. However, since the vehicle is moving, the common case is that at some point (considering the camera scene perspective changes) all weeds will be visible at some point and can be targeted. For example, say weed-x and weed-y are intersected from a specific point of view. At time t the system will target the first one—and in a later timestamp t+u the system will detect the other weed and will target it.

The system optionally also includes a tracker which records and keeps track of each specific weed/target individually and thus the system knows which weed has been targeted in a previous time or not.

The present disclosure encompasses embodiments and methodologies that may comprise more or fewer steps than those described above, and/or one or more steps that are different than the steps described above. Additionally, the techniques disclosed herein can be performed by the associated component(s) shown in FIGS. 5-6 as appropriate.

Any of the steps, functions, and operations discussed herein can be performed continuously and automatically.

The exemplary systems and methods of this disclosure have been described in relation to a weeding system. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show some of the various components of the system collocated, certain components of the system can be located remotely, at distant portions of a distributed network, such as a LAN and/or the Internet, in the cloud, and/or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on a programmed general-purpose computer with the cooperation of a controller and memory, a special purpose computer, a microprocessor, or the like. In these instances, the systems and methods of this disclosure can be implemented as a program embedded on a personal computer such as an applet, JAVA®, C+, C++, Python, Rust, or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Exemplary embodiments may be configured according to the following:

An apparatus, comprising:

one or more laser weeding modules, each laser weeding module including:

a camera sensor;

two or more direct diode or fiber laser sources, each having an associated laser scan head;

an absolute distance sensor;

an artificial intelligence model configured for depth estimation and 3D surface reconstruction;

an artificial intelligence model configured for target identification; and a controller configured to utilize targeting information to identify a target weed, direct a laser scan head to direct a laser to the target weed, and energize the laser to eliminate the weed.

Any of the above aspects, wherein the elimination of the weed include targeting the laser at the base of the weed to destroy a root.

Any of the above aspects, wherein image information from the camera sensor is analyzed by the artificial intelligence model that is configured for target identification to identify the target weed.

Any of the above aspects, wherein targeting information for the scan heads includes transforming pixel coordinates to laser-scan-head commands for targets.

Any of the above aspects, further comprising a plurality of the one or more laser weeding modules affixed to a frame that is configured for attachment to a vehicle.

Any of the above aspects, wherein the laser scan heads target the weed based upon a depth estimation process which reconstructs a 3D surface below a laser weeding module.

Any of the above aspects, wherein each of the one or more laser weeding modules perform parallel and asynchronous weed detection and targeting.

Any of the above aspects, wherein the artificial intelligence model configured for target identification includes an evolutionary function to retrain its own models.

Any of the above aspects, wherein each of the laser weeding modules is configured to direct the laser to the target weed, direct two lasers to the target weed, and/or direct two lasers to two different weeds.

Any of the above aspects, wherein the apparatus is configured for mounting to a tractor, ATV, or drone.

A weeding method comprising:

detecting, by a camera sensor, one or more plants;

determining, by an absolute distance sensor, a distance from a laser weeding module to a ground;

determining, by an artificial intelligence model, a depth estimation and 3D surface reconstruction;

determining, by an artificial intelligence model, a target identification; and controlling, utilizing targeting information, a laser scan head to direct a laser to a target weed, and energizing the laser to eliminate the weed.

Any of the above aspects, wherein the elimination of the weed includes targeting the laser at the base of the weed to destroy one or more of a root and a meristem.

Any of the above aspects, wherein image information from a camera sensor is analyzed by the artificial intelligence model for target identification to identify the target weed.

Any of the above aspects, wherein targeting information for scan heads includes transforming pixel coordinates to laser-scan-head commands for targets.

Any of the above aspects, further comprising attaching a plurality of one or more laser weeding modules to a frame that is configured for attachment to a vehicle.

Any of the above aspects, further comprising targeting, by laser scan heads, the weed based upon a depth estimation process which reconstructs a 3D surface below a laser weeding module.

Any of the above aspects, wherein the method performs parallel and asynchronous weed detection and targeting.

Any of the above aspects, wherein the artificial intelligence model configured for target identification includes an evolutionary function to retrain its own models.

Any of the above aspects, further comprising directing each laser weeding module to direct a laser to the target weed, direct two lasers to the target weed, and/or direct two lasers to two different weeds.

Any of the above aspects, further comprising determining a mapping between pixel coordinates and scan-head commands.

A weed killing apparatus comprising:

a plurality of laser weeding modules attached to a frame configured for attachment to a vehicle, each laser weeding module including:

a camera sensor;

two or more direct diode or fiber laser sources, each having an associated laser scan head;

an absolute distance sensor;

an artificial intelligence model configured for depth estimation and 3D surface reconstruction;

an artificial intelligence model configured for target identification; and a controller configured to utilize targeting information to identify at least one target weed, direct at least one laser scan head to direct at least one laser to the target weed, and energize the at least one laser to eliminate the at least one target weed.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Use of any one or more of the aspects or features as disclosed herein to identify and classify a metal object.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The details of one or more aspects of the disclosure are set forth in the accompanying drawings and the description herein. Other features, objects, and advantages of the techniques described in this disclosure will be apparent from the description and drawings, and from the claims.

The invention claimed is:

1. An apparatus, comprising:

one or more laser weeding modules, each laser weeding module including:

a camera sensor;

two or more direct diode or fiber laser sources, each having an associated laser scan head;

an absolute distance sensor;

at least one artificial intelligence model configured for; depth estimation, 3D surface reconstruction, and target identification; and a controller configured to utilize targeting information to identify a target weed, direct a laser scan head to direct a laser to the target weed, and energize the laser to eliminate the weed. wherein the apparatus is configured for mounting to a tractor, ATV, or drone, and there is an IR cut-off filter at an input to the camera sensor.

2. The apparatus of claim 1, wherein eliminating the weed includes targeting the laser at at least one of: a base of the weed to destroy a root and/or a meristem of the weed to cause fatal damage to the weed's growth.

3. The apparatus of claim 1, wherein image information from the camera sensor is analyzed by the at least one artificial intelligence model that is configured for target identification to identify the target weed.

4. The apparatus of claim 1, wherein targeting information for the scan heads includes transforming pixel coordinates to laser-scan-head commands for targets.

5. The apparatus of claim 1, further comprising a plurality of the one or more laser weeding modules affixed to a frame that is configured for attachment to a vehicle.

6. The apparatus of claim 1, wherein the laser scan heads target the weed based upon a depth estimation and 3D reconstruction process.

7. The apparatus of claim 1, wherein for a plurality of laser weeding modules, the plurality of laser weeding modules perform parallel and asynchronous weed detection and targeting.

8. The apparatus of claim 1, wherein the at least one artificial intelligence model configured for target identification includes an evolutionary function to retrain its own models.

9. The apparatus of claim 1, wherein each of the laser weeding modules is configured to direct the laser to the target weed, direct two lasers to the target weed, and/or direct two lasers to two different weeds.

10. The apparatus of claim 1, wherein the IR cut-off filter is configured to at least block laser reflections.

11. A weeding method comprising:

detecting, by a camera sensor, one or more plants, wherein an IR cut-off filter filters an input to the camera sensor;

determining, by an absolute distance sensor, a distance from a laser weeding module to a ground;

determining, by at least one artificial intelligence model, a depth estimation, 3D surface reconstruction, and a target identification; and controlling, utilizing targeting information, a laser scan head to direct a laser to a target weed, and energizing the laser to eliminate the weed, wherein at least the laser scan head is configured for mounting to a tractor, ATV, or drone.

12. The method of claim 11, wherein the elimination of the weed includes targeting the laser at the base of the weed to destroy a root and/or at a meristem of the weed.

13. The method of claim 11, wherein image information from a camera sensor is analyzed by the at least one artificial intelligence model for target identification to identify the target weed.

14. The method of claim 11, wherein targeting information for scan heads includes transforming pixel coordinates to laser-scan-head commands for targets.

15. The method of claim 11, further comprising attaching a plurality of one or more laser weeding modules to a frame that is configured for attachment to a vehicle.

16. The method of claim 11, further comprising targeting, by laser scan heads, the weed based upon a depth estimation process which reconstructs a 3D surface below a laser weeding module.

17. The method of claim 11, wherein the method performs parallel and asynchronous weed detection and targeting.

18. The method of claim 11, wherein the at least one artificial intelligence model configured for target identification includes an evolutionary function to retrain its own models.

19. The method of claim 11, further comprising directing each laser weeding module to direct a laser to the target weed, direct two lasers to the target weed, and/or direct two lasers to two different weeds.

20. The method of claim 11, further comprising determining a mapping between pixel coordinates and scan-head commands.

21. A weed killing apparatus comprising:
a plurality of laser weeding modules attached to a frame configured for attachment to a vehicle, each laser weeding module including:
a camera sensor;
two or more direct diode or fiber laser sources, each having an associated laser scan head;
an absolute distance sensor;
at least one artificial intelligence model configured for depth estimation, 3D surface reconstruction, and for target identification; and
a controller configured to utilize targeting information to identify at least one target weed, direct at least one laser scan head to direct at least one laser to the target weed, and energize the at least one laser to eliminate the at least one target weed, wherein the apparatus is configured for mounting to a tractor. ATV, or drone, and there is an IR cut-off filter at an input to the camera sensor.

22. The apparatus of claim 1, wherein the camera is configured to track the weed during laser operation with the IR cut-off filter blocking laser reflections.

23. The method of claim 11, further comprising blocking laser reflections with the IR cut-off filter during tracking of the weed.

24. The apparatus of claim 21, wherein the camera sensor is configured to track the at least one target weed during laser operation with the IR cut-off filter blocking laser reflections.

* * * * *